US012717346B2

(12) United States Patent
Lee et al.

(10) Patent No.: US 12,717,346 B2
(45) Date of Patent: Aug. 25, 2026

(54) ROBOT AND CONTROL METHOD THEREOF

(71) Applicant: SAMSUNG ELECTRONICS CO., LTD., Suwon-si (KR)

(72) Inventors: Jaeha Lee, Suwon-si (KR); Soonbeom Kwon, Suwon-si (KR); Yeonjun Lee, Suwon-si (KR); Junyeong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 18/768,863

(22) Filed: Jul. 10, 2024

(65) Prior Publication Data

US 2025/0083320 A1 Mar. 13, 2025

Related U.S. Application Data

(63) Continuation of application No. PCT/KR2024/007986, filed on Jun. 11, 2024.

(30) Foreign Application Priority Data

Sep. 13, 2023 (KR) ........................ 10-2023-0121724

(51) Int. Cl.
*G05D 1/633* (2024.01)
*G05D 1/243* (2024.01)
(Continued)

(52) U.S. Cl.
CPC ........... *G05D 1/633* (2024.01); *G05D 1/2437* (2024.01); *G05D 1/43* (2024.01); *G05D 1/651* (2024.01)

(58) Field of Classification Search
CPC ........ B25J 9/1666; B25J 9/1697; B25J 9/162; B25J 13/089; B25J 5/00; B25J 5/007;
(Continued)

(56) References Cited

U.S. PATENT DOCUMENTS 10,816,994 B2 10/2020 Tian et al.
11,513,522 B2 11/2022 Choi et al.
(Continued)

FOREIGN PATENT DOCUMENTS

CN 111958596 B 3/2022
JP 7311172 B2 7/2023
(Continued)

OTHER PUBLICATIONS

International Search Report and Written Opinion (PCT/ISA/220, PCT/ISA/210, and PCT/ISA/237) dated Sep. 19, 2024, issued by International Searching Authority for International Application No. PCT/KR2024/007986.
(Continued)

*Primary Examiner* — Spencer D Patton
(74) *Attorney, Agent, or Firm* — Sughrue Mion, PLLC

(57) ABSTRACT

A drivable robot includes: at least one sensor; a driver; at least one processor; and memory storing one or more instructions that, when executed by the at least one processor, cause the robot to: based on identifying a revolving door in a photographed image obtained by the at least one sensor, identify free space information of a free space inside the revolving door and object information of an object that is to enter the revolving door based on the photographed image; identify a first time point for the robot to enter the revolving door based on the free space information and the object information; and control the driver such that the robot enters the revolving door at the first time point.

20 Claims, 17 Drawing Sheets

(51) Int. Cl.
*G05D 1/43* (2024.01)
*G05D 1/65* (2024.01)

(58) Field of Classification Search
CPC ......... B25J 11/008–009; B66B 1/3461; G05D 1/686; G05D 1/69–695; G05D 1/0246; G05D 1/0212; G05D 1/0214; G05D 1/0223; G05D 1/0225; G05D 1/2437; G05D 1/43; G05D 1/633; G05D 1/622; G05D 1/617; G05D 1/637; G05D 1/651; G05D 1/663; G05D 2107/40; G05D 2107/60–68
See application file for complete search history.

(56) References Cited

U.S. PATENT DOCUMENTS 11,966,226 B2 4/2024 Yoo et al.
12,353,215 B2 7/2025 Sternitzke
2021/0154843 A1 5/2021 Choi et al.
2021/0255646 A1 8/2021 Weiss et al.
2022/0017332 A1 1/2022 Kim et al.
2023/0068618 A1* 3/2023 Yoo ........................ G05D 1/249
2024/0045432 A1 2/2024 Chae et al.

FOREIGN PATENT DOCUMENTS

KR 10-2021-0063121 A 6/2021
KR 10-2021-0083812 A 7/2021
KR 20210083812 A * 7/2021 ............ B25J 9/1664
KR 10-2022-0009078 A 1/2022
KR 10-2433438 B1 8/2022
KR 10-2022-0145144 A 10/2022
KR 10-2489722 B1 1/2023
KR 10-2023-0033980 A 3/2023
WO 2023/033232 A1 3/2023

OTHER PUBLICATIONS

B. Brito, B. Floor, L. Ferranti and J. Alonso-Mora, "Model Predictive Contouring Control for Collision Avoidance in Unstructured Dynamic Environments," arXiv.2010.10190v1 [cs. RO], vol. 4, No. 4, 8 pages, Oct. 20, 2020, doi: 10.1109/LRA.2019.2929976.
Extended European Search Report issued Jun. 11, 2026 by the European Patent Office for EP Patent Application No. 24865616.7.

* cited by examiner

FIG. 14

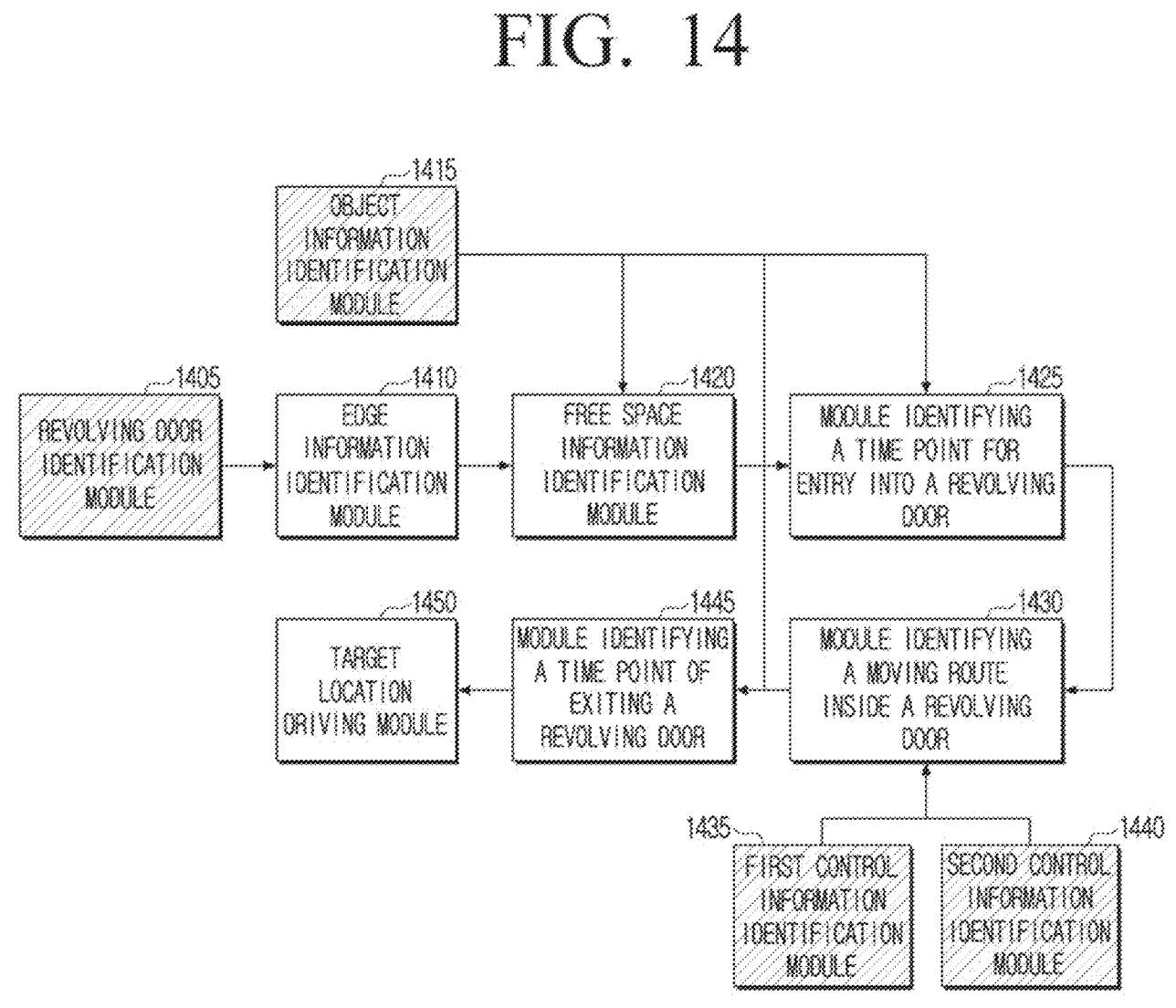

1405 REVOLVING DOOR IDENTIFICATION MODULE

1410 EDGE INFORMATION IDENTIFICATION MODULE

1415 OBJECT INFORMATION IDENTIFICATION MODULE

1420 FREE SPACE INFORMATION IDENTIFICATION MODULE

1425 MODULE IDENTIFYING A TIME POINT FOR ENTRY INTO A REVOLVING DOOR

1430 MODULE IDENTIFYING A MOVING ROUTE INSIDE A REVOLVING DOOR

1435 FIRST CONTROL INFORMATION IDENTIFICATION MODULE

1440 SECOND CONTROL INFORMATION IDENTIFICATION MODULE

1445 MODULE IDENTIFYING A TIME POINT OF EXITING A REVOLVING DOOR

1450 TARGET LOCATION DRIVING MODULE

ROBOT AND CONTROL METHOD THEREOF

CROSS-REFERENCE TO RELATED APPLICATIONS

This application is a by-pass continuation application of International Application No. PCT/KR2024/007986, filed on Jun. 11, 2024, which is based on and claims priority to Korean Patent Application No. 10-2023-0121724, filed on Sep. 13, 2023, in the Korean Intellectual Property Office, the disclosures of which are incorporated by reference herein in their entireties.

BACKGROUND

1. Field

The disclosure relates to a robot and a control method thereof, and more particularly, to a robot that passes through a revolving door in consideration of information on the revolving door and information on an object obtained based on a photographed image for a driving space, and a control method thereof.

2. Description of the Related Art

Spurred by the development of electronic technologies, various types of electronic devices are being developed and distributed, and recently, development of technologies for robots providing services to users, for example, is being pursued.

In the case of a robot that drives in a space for providing a service to a user, a situation wherein the robot passes through a revolving door that exists on the driving route may occur. For the robot to pass through the revolving door safely, the characteristics of the revolving door and the operating state of the revolving door should be considered. Also, the robot should pass through the revolving door in consideration of a moving line of a person who is currently using the revolving door or is going to use the revolving door.

SUMMARY

According to one or more embodiments, a drivable robot includes: at least one sensor; a driver; at least one processor; and memory storing one or more instructions that, when executed by the at least one processor, cause the robot to: based on identifying a revolving door in a photographed image obtained by the at least one sensor, identify free space information of a free space inside the revolving door and object information of an object that is to enter the revolving door based on the photographed image; identify a first time point for the robot to enter the revolving door based on the free space information and the object information; and control the driver such that the robot enters the revolving door at the first time point.

The at least one processor may be configured to execute the one or more instructions to cause the robot to: based on identifying the robot is to enter the revolving door at a current time point, control the driver such that the robot enters the revolving door; and based on identifying the robot is not to enter the revolving door at the current time point, control the driver such that the robot waits for a second time point for the robot to enter the revolving door, or identify a driving route avoiding the revolving door.

The robot may be configured to store first space information corresponding to the robot in the memory, and the at least one processor may be configured to execute the one or more instructions to cause the robot to: identify whether a first shape of a space corresponding to the robot is inside a second shape of the free space based on the free space information and the first space information; and based on identifying the first shape is inside the second shape, identify a third time point for the robot to enter the revolving door based on a first location of the free space.

The robot may be configured to store second space information corresponding to the object in the memory, the object information may further include moving route information of a moving route of the object, and the at least one processor may be configured to execute the one or more instructions to cause the robot to: based on identifying at least one first object is to enter the revolving door based on the moving route information, update the free space information based on the second space information; identify whether the first shape is inside the second shape based on the updated free space information and the first space information; and based on identifying the first shape is inside a third shape of an updated free space of the updated free space information, identify a fourth time point for the robot to enter the revolving door based on a second location of the updated free space.

The at least one processor may be configured to execute the one or more instructions to cause the robot to: based on identifying at least one second object is to enter the revolving door based on the moving route information, identify: a number of the at least one second object, and an entering location inside the revolving door; and identify a fifth time point for the robot to enter the revolving door based on: the number of the at least one second object, and the entering location inside the revolving door.

The free space information may include at least one of radius information, rotation axis information, or angle information of an angle corresponding to the free space, and the at least one processor may be configured to execute the one or more instructions to cause the robot to: identify location information of a third location of the free space inside the revolving door and moving speed information of a moving speed of the free space based on the free space information; and identify a sixth time point for the robot to enter the revolving door based on the location information and the moving speed information.

The at least one processor may be configured to execute the one or more instructions to cause the robot to, based on the robot entering the revolving door, control the driver such that the robot is located in a center area of an inscribed circle corresponding to the free space.

The at least one processor may be configured to execute the one or more instructions to cause the robot to: based on the robot entering the revolving door, identify a predetermined reference point in a swing door corresponding to the free space; and control the driver such that the robot moves to follow the predetermined reference point.

The at least one processor may be configured to execute the one or more instructions to cause the robot to: identify first control information for the robot to be located in a center area of an inscribed circle corresponding to the free space; identify second control information for the robot to move to follow the predetermined reference point; identify third control information for the robot to move inside the revolving door based on applying a predetermined weight to each of the first control information and the second control information; and control the driver based on the third control information.

The at least one processor may be configured to execute the one or more instructions to cause the robot to: based on the robot entering the revolving door, identify whether a swing door corresponding to the free space is located within a predetermined distance from a target location outside the revolving door; and control the driver such that the robot exits the revolving door within a predetermined time from a seventh time point when the swing door was identified to be located within the predetermined distance.

The at least one processor may be configured to execute the one or more instructions to cause the robot to: identify whether at least one third object located inside the revolving door is exiting the revolving door; and based on identifying the at least one third object exited the revolving door, control the driver such that the robot exits the revolving door within the predetermined time from the seventh time point.

According to one or more embodiments, a control method of a drivable robot includes: based on identifying a revolving door in a photographed image obtained by at least one sensor, identifying free space information of a free space inside the revolving door and object information of an object that is to enter the revolving door based on the photographed image; identifying a first time point for the robot to enter the revolving door based on the free space information and the object information; and controlling a driver such that the robot enters the revolving door at the first time point.

The controlling the driver may include, based on identifying the robot is to enter the revolving door at a current time point, controlling the driver such that the robot enters the revolving door, and the control method may further include, based on identifying the robot is not to enter the revolving door at the current time point, controlling the driver such that the robot waits for a second time point for the robot to enter the revolving door, or identifying a driving route avoiding the revolving door.

The identifying the first time point may include: identifying whether a first shape of a space corresponding to the robot is inside a second shape of the free space based on the free space information and first space information corresponding to the robot; and based on identifying the first shape is inside the second shape, identifying a third time point for the robot to enter the revolving door based on a first location of the free space.

The object information may further include moving route information of a moving route of the object, and the identifying the first time point may include: based on identifying at least one first object is to enter the revolving door based on the moving route information, updating the free space information based on second space information corresponding to the object; identifying whether the first shape is inside the second shape based on the updated free space information and the first space information; and based on identifying the first shape is inside a third shape of an updated free space of the updated free space information, identifying a fourth time point for the robot to enter the revolving door based on a second location of the updated free space.

The identifying the first time point may further include: based on identifying at least one second object is to enter the revolving door based on the moving route information, identifying: a number of the at least one second object, and an entering location inside the revolving door; and identifying a fifth time point for the robot to enter the revolving door based on: the number of the at least one second object, and the entering location inside the revolving door.

The free space information may include at least one of radius information, rotation axis information, or angle information of an angle corresponding to the free space, and the identifying the first time point may include: identifying location information of a third location of the free space inside the revolving door and moving speed information of a moving speed of the free space based on the free space information; and identifying a sixth time point for the robot to enter the revolving door based on the location information and the moving speed information.

The control method may further include, based on the robot entering the revolving door, controlling the driver such that the robot is located in a center area of an inscribed circle corresponding to the free space.

The control method may further include: based on the robot entering the revolving door, identifying a predetermined reference point in a swing door corresponding to the free space; and controlling the driver such that the robot moves to follow the predetermined reference point.

According to one or more embodiments, a non-transitory computer-readable recording medium storing computer instructions that, when executed by at least one processor, cause a drivable robot to: based on identifying a revolving door in a photographed image obtained by at least one sensor, identify free space information of a free space inside the revolving door and object information of an object that is to enter the revolving door based on the photographed image; identify a first time point for the robot to enter the revolving door based on the free space information and the object information; and control a driver such that the robot enters the revolving door at the first time point.

BRIEF DESCRIPTION OF THE DRAWINGS

The above and other aspects, features, and advantages of certain embodiments of the present disclosure are more apparent from the following description taken in conjunction with the accompanying drawings, in which:

FIG. 14 is a block diagram for illustrating a control method of a robot according to one or more embodiments.

DETAILED DESCRIPTION

Hereinafter, the disclosure will be described in detail with reference to the accompanying drawings.

First, terms used in this specification will be described briefly, and then the disclosure will be described in detail.

With respect to terms used in describing one or more embodiments, widely used terms may be included in consideration of the features described in the disclosure. However, the terms may vary depending on the intention of those skilled in the art, previous court decisions, or emergence of new technologies, for example. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, expressions such as "have," "may have," "include," and "may include" denote the existence of such characteristics (for example, elements such as numerical values, functions, operations, and components), and do not exclude the existence of additional characteristics.

In addition, the expression "at least one of A and/or B" should be interpreted to mean any one of "A" or "B" or "A and B."

Further, the expressions "first," "second," and the like, may be used to describe various elements regardless of any order and/or degree of importance. Also, such expressions are used only to distinguish one element from another element, and are not intended to limit the elements.

The description in the disclosure that one element (for example, a first element) is "(operatively or communicatively) coupled with/to" or "connected to" another element (for example, a second element) should be interpreted to include both the case where the one element is directly coupled to the another element, and the case where the one element is coupled to the another element through another element (for example, a third element).

Also, singular expressions also include plural expressions, as long as they do not clearly mean differently in the context. Further, in the disclosure, terms such as "include" and "consist of" should be construed as designating that there are such characteristics, numbers, steps, operations, elements, components, or a combination thereof, but not as excluding in advance the existence or possibility of adding one or more of other characteristics, numbers, steps, operations, elements, components or a combination thereof.

In addition, in the disclosure, "a module" or "a part" may perform at least one function or operation, and may be implemented as hardware or software, or as a combination of hardware and software. Further, a plurality of "modules" or "parts" may be integrated into at least one module and implemented as at least one processor, excluding "a module" or "a part" that may be implemented in hardware.

Figure 1:
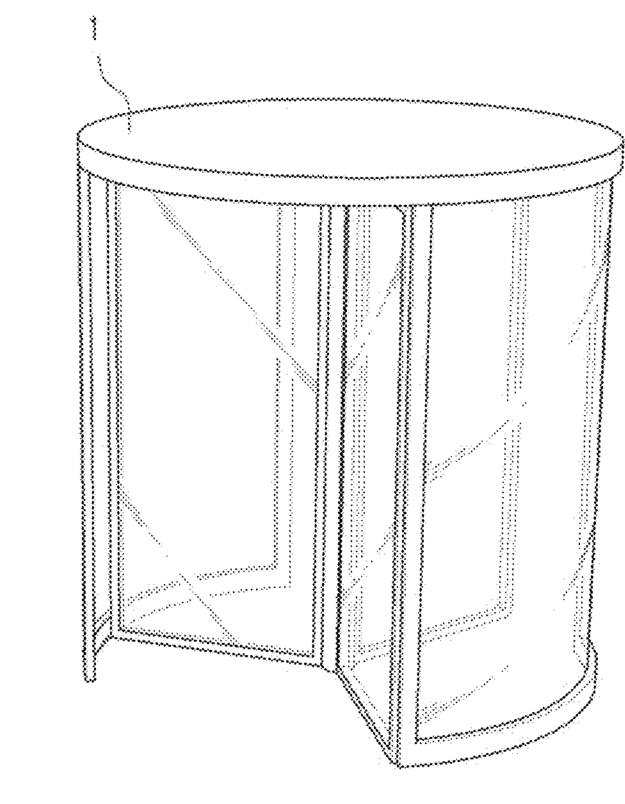
FIG. 1 is a diagram for schematically illustrating a control method of a robot according to one or more embodiments.
Figure 1:
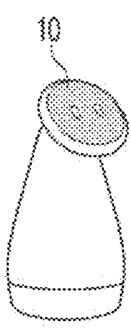

FIG. 1 is a diagram for schematically illustrating a control method of a robot according to one or more embodiments.

According to FIG. 1, a robot 10 may drive in a driving space and reach a destination according to one or more embodiments. The robot 10 may be a robot that moves to a location and provides a service to a user. According to one or more embodiments, the robot may be driving robots in different types including a drone and a wheel robot, but is not limited thereto.

According to one or more embodiments, the robot 10 may pass through a revolving door 1 for reaching a destination. Here, the revolving door 1 is an object in a cylindrical form, and it may be an object including a plurality of rotatable doors (or, swing doors). According to one or more embodiments, the robot 10 may obtain a photographed image for a driving space. The robot 10 may identify the revolving door 1 in the driving route based on the obtained photographed image for the driving space. According to one or more embodiments, the revolving door 1 may rotate at a predetermined speed, and there may be a change of the speed according to whether there is an object, but the disclosure is not limited thereto, and the revolving door 1 may be a revolving door that rotates at the predetermined speed regardless of whether there is an object. Here, an object may be a person according to one or more embodiments, but is not limited thereto, and an object may be a robot or an animal that goes into or out of the revolving door 1. According to one or more embodiments, based on the revolving door 1 being identified, the robot 10 may identify a time point for it to enter the revolving door 1. The robot 10 may identify a time point for it to enter the revolving door 1 by using information on a space wherein the robot 10 may move inside the revolving door 1 and information on an object that entered or is going to enter the revolving door 1.

The robot 10 may enter the revolving door 1 based on the identified time point for it to enter the revolving door 1. When the robot 10 enters the revolving door 1, the robot 10 may move inside the revolving door 1 based on the moving speed of the revolving door 1. In this case, the robot 10 may move while being located in a predetermined area inside the revolving door 1 in consideration of an object inside the revolving door 1.

Hereinafter, one or more embodiments will be described for the robot 10 to determine a time point for it to enter the revolving door, to enter the revolving door at an appropriate time point, to drive in consideration of information on a free space and information on an object inside the revolving door, and to exit the revolving door safely in consideration of information on an edge of the revolving door and the information on the object.

Figure 2:
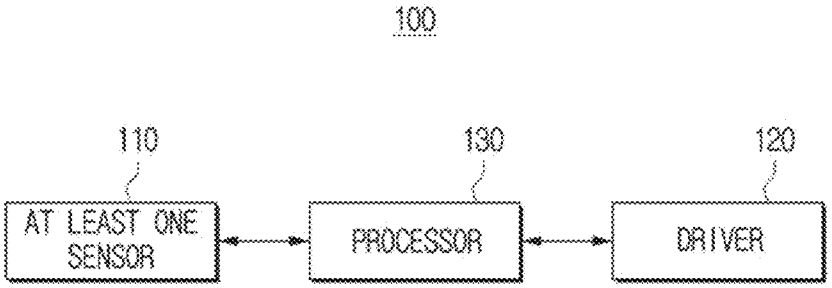
FIG. 2 is a block diagram illustrating a configuration of a robot according to one or more embodiments.

FIG. 2 is a block diagram illustrating a configuration of a robot according to one or more embodiments.

According to FIG. 2, the robot 100 may include at least one sensor 110, a driver 120, and at least one processor 130.

The at least one sensor 110 (referred to as the sensor hereinafter) may include a plurality of sensors in various types. The sensor 110 may measure a physical amount or detect an operation state of the robot 100, and convert the measured or detected information into an electric signal. The sensor 110 may include a camera, and the camera may include a lens that focuses various visible optical signals that are reflected by an object and received into an image sensor, and an image sensor that may detect various visible optical signals. Here, the image sensor may include a 2D pixel array divided into a plurality of pixels. According to one or more embodiments, the robot 100 may obtain a photographed image for a driving space through the at least one sensor 110.

The camera according to one or more embodiments may be implemented as a depth camera. Also, according to one or more embodiments, the sensor 110 may include not only a distance sensor such as a light detection and ranging (LiDAR) sensor and a time of flight (ToF) sensor, but also a thermal imaging sensor that reads a shape.

The driver 120 is a device that may make the robot 100 drive. The driver 120 may adjust a driving direction and a driving speed according to control by the at least one processor 130, and the driver 120 according to one or more embodiments may include a power generation device (for example, a gasoline engine, a diesel engine, a liquefied petroleum gas (LPG) engine, an electric motor, for example, according to the used fuel (or the energy source)) that generates power for the robot 100 to drive, a steering device (for example, manual steering, hydraulics steering, electronic control power steering (EPS), for example) for adjusting a driving direction, a driving device (for example, wheels, a propeller, for example) making the robot 100 drive according to power, for example. Here, the driver 120 may be implemented while being modified according to the driving type (for example, a wheel type, a walking type, or a flying type) of the robot 100.

The at least one processor 130 (referred to as the processor hereinafter) is electrically connected with the at least one sensor 110 and the driver 120, and controls the overall operations of the robot 100. The processor 130 may consist of one or a plurality of processors. The processor 130 may perform the operations of the robot 100 according to one or more embodiments by executing at least one instruction stored in a memory.

According to one or more embodiments, the processor 130 may be implemented as a digital signal processor (DSP) processing digital image signals, a microprocessor, a graphics processing unit (GPU), an artificial intelligence (AI) processor, a neural processing unit (NPU), and a time controller (TCON). However, the disclosure is not limited thereto, and the processor 130 may include one or more of a central processing unit (CPU), a micro controller unit (MCU), a micro processing unit (MPU), a controller, an application processor (AP), or a communication processor (CP), and an ARM processor, or may be defined by the terms. Also, the processor 130 may be implemented as a system on chip (SoC) having a processing algorithm stored therein or large scale integration (LSI), or implemented in the form of an application specific integrated circuit (ASIC), or a field programmable gate array (FPGA).

According to one or more embodiments, the processor 130 may identify a revolving door inside a driving space based on a photographed image obtained through the sensor 110. According to one or more embodiments, the revolving door may include at least one swing door, and include a plurality of boarding spaces as illustrated in FIG. 1. The swing door is a rotatable door that divides a space inside the revolving door into a plurality of sub spaces. According to one or more embodiments, the revolving door may include a plurality of swing doors. According to one or more embodiments, the processor 130 may obtain a photographed image corresponding to a driving space through the sensor 110, and identify a revolving door that exists in the obtained photographed image by using a trained neural network model. According to one or more embodiments, the trained neural network model may have been stored in advance in the memory, and the trained neural network model may be a neural network model that was trained to receive input of a photographed image for a driving space, and output information regarding whether a revolving door exists in the photographed image.

However, the disclosure is not limited thereto, and according to one or more embodiments, map information for a driving space may be stored in the memory, and in the map information for the driving space, information on the location and the size of a revolving door that exists in the driving space may be included. The processor 130 may identify a revolving door inside the driving space by using the map information stored in the memory or the trained neural network model. According to one or more embodiments, the processor 130 may identify whether a revolving door exists on the driving route of the robot 100.

According to one or more embodiments, the processor 130 may identify information on a free space inside the revolving door and information on an object corresponding to the revolving door. Inside the revolving door, a moving space and a free space exist. The moving space means a bottom area corresponding to a space wherein the robot 100 or the object may move inside the revolving door, and the free space means a bottom area corresponding to the space excluding the space wherein the object exists in the moving space inside the revolving door. For example, the free space means a bottom area corresponding to a space wherein the robot 100 may freely move inside the revolving door. According to one or more embodiments, the processor 130 may identify information on an edge corresponding to the revolving door based on a photographed image, and identify information on the moving space and information on the free space inside the revolving door based on the identified edge information. The edge information corresponding to the revolving door is information on the contour line (or, the outline) of the revolving door that exists in the photographed image. However, the disclosure is not limited thereto, and the edge information may be information on a line that was calculated based on a pixel value inside the photographed image. The edge information may include a straight line or a curved line corresponding to a point wherein the revolving door and the bottom inside the driving space meet, or include a straight line perpendicular to the bottom in the outline corresponding to the revolving door.

For example, if edge information corresponding to the revolving door is identified based on a photographed image, the processor 130 may identify an area for an object inside the revolving door to board based on the identified edge information, and identify this as moving space information. In this case, the moving space information may be information on an area excluding an area corresponding to the swing door in the bottom area of the revolving door (the area wherein the revolving door and the bottom inside the driving space meet). According to one or more embodiments, the processor 130 may identify an area excluding an area occupied by an object in a moving space as a free space. In this case, an area excluding an area including a predetermined margin area in the area occupied by the object may be identified as a free space. The predetermined margin area is an area adjacent to the bottom area of the object according to one or more embodiments, and it may be an area located within a predetermined distance from the bottom area. According to one or more embodiments, the moving space information may include location information and moving speed information corresponding to the moving space inside the revolving door, and the free space information may include location information and moving speed information corresponding to the free space inside the revolving door.

According to one or more embodiments, the processor 130 may identify information on an object corresponding to the revolving door based on a photographed image. The object may be a person, for example, but is not limited thereto. According to one or more embodiments, an object corresponding to the revolving door may include an object that entered the revolving door or an object that is going to enter the revolving door. The information on the object may include information on a moving route of the object according to one or more embodiments. The processor 130 may identify or predict a moving route of the object by using a photographed image that is obtained in real time.

According to one or more embodiments, the processor 130 may identify a time point for the robot 100 to enter the revolving door. Also, according to one or more embodiments, the processor 130 may identify a time point for the robot 100 to enter the revolving door based on the identified information on the free space and the identified information on the object. For example, if the processor 130 identifies that the size of the robot 100 may be included in the free space inside the revolving door, the robot 100 may enter the free space inside the revolving door. In this case, the processor 130 may identify information on the rotating speed of the revolving door and the location of the entrance of the revolving door based on the edge information of the revolving door, and identify a time point for the robot 100 to enter the revolving door based on the identified information.

According to one or more embodiments, the processor 130 may identify whether the robot 100 may enter the revolving door. For example, in case the size of the robot 100 may not be included in the moving space of the revolving door, the processor 130 may identify that the robot 100 may not enter the revolving door. Alternatively, in case the size of the robot 100 is included in the moving space of the revolving door, the processor 130 may identify that the robot 100 may enter the revolving door. In case it is identified that the robot 100 may enter the revolving door, the processor 130 may identify a time point for the robot 100 to enter the revolving door.

For example, the processor 130 may identify whether the robot 100 may enter the revolving door on the current time point based on the information on the object corresponding to the revolving door and the information on the free space, and if it is identified that the robot 100 may enter the revolving door on the current time point, the processor 130 may control the driver 120 such that the robot 100 enters the revolving door. Alternatively, for example, the robot 100 may enter the revolving door if a movement of an object that is going to exit the revolving door or an object that is going to enter the revolving door is finished. In this case, the processor 130 may control the driver 120 such that the robot 100 enters the revolving door within a time section wherein the inlet of the revolving door is opened based on the free space information. The time section wherein the inlet of the revolving door is opened means a time section wherein the robot 100 may enter the revolving door as an obstacle (or, a screen) for preventing entry of an object into the revolving door was removed. A method for identifying a time point for the robot 100 to enter the revolving door will be described in detail through FIG. 5 to FIG. 7B.

According to one or more embodiments, the processor 130 may control the driver 120 such that the robot 100 enters the revolving door at a time point for it to enter the revolving door. Also, according to one or more embodiments, the processor 130 may control the driver 120 such that the robot 100 enters the revolving door within the time section wherein the revolving door is opened. In this case, if an object inside the revolving door exits the revolving door, or there is an object that is going to enter the revolving door, the processor 130 may control the driver 120 such that the robot 100 enters the revolving door after a movement of the object is finished.

According to one or more embodiments, a trained neural network model may be stored in the memory. Also, according to one or more embodiments, the trained neural network model may be a neural network model that was trained to receive input of a photographed image and output driving information for the robot 100 to pass through the revolving door (for example, information on an entering point for the robot 100 to enter the revolving door, control information for controlling the driver 120 such that the robot 100 enters the revolving door, control information for the robot 100 to drive inside the revolving door, information on an exiting point for the robot 100 to exit the revolving door, or control information for controlling the driver 120 such that the robot 100 exits the revolving door). The processor 130 may obtain the driving information for the robot 100 to pass through the revolving door by inputting a photographed image for the driving space into the trained neural network model.

Figure 3:
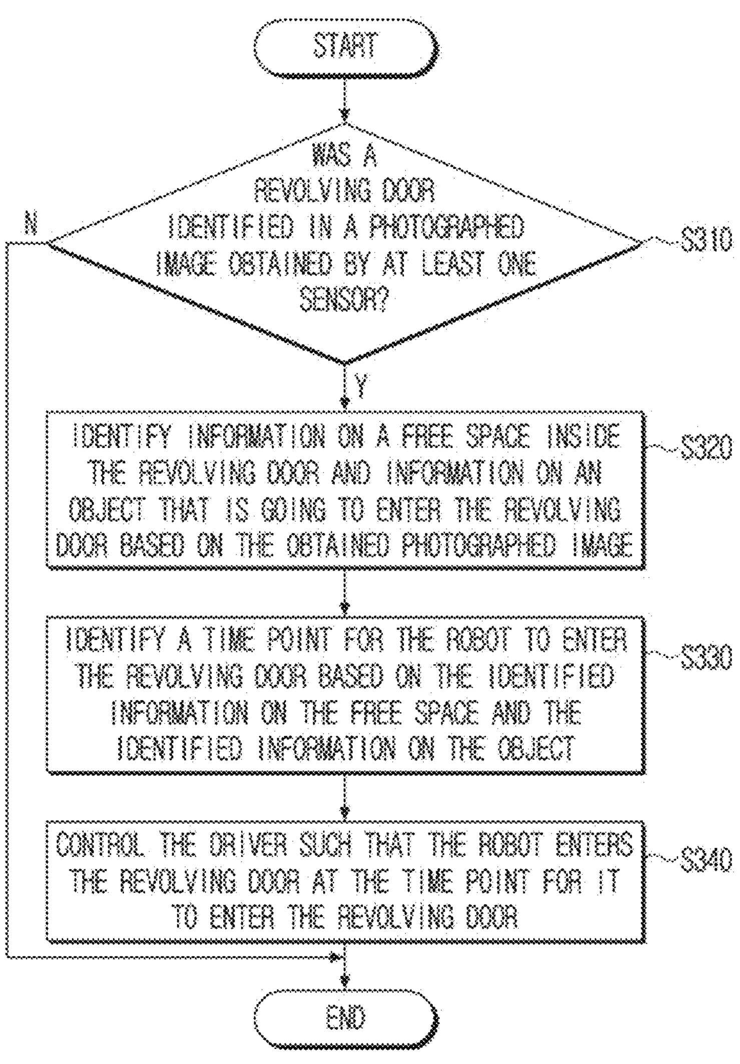
FIG. 3 is a flow chart for illustrating a control method of a robot according to one or more embodiments.

FIG. 3 is a flow chart and a diagram for illustrating a control method of the robot 100 according to one or more embodiments.

According to FIG. 3, first, in a control method according to one or more embodiments, it may be identified whether a revolving door is identified in a photographed image obtained by the at least one sensor 110 in operation S310. According to one or more embodiments, if a photographed image for a driving space is obtained through the sensor 110, the processor 130 may identify whether a revolving door is included in the obtained image. For example, the processor 130 may input the photographed image into the trained neural network model stored in the memory, and identify whether a revolving door is included in the photographed image.

According to one or more embodiments, in the control method, if a revolving door is identified in the photographed image in operation S310:Y, information on a free space inside the revolving door and information on an object that is going to enter the revolving door may be identified based on the obtained photographed image in operation S320. According to one or more embodiments, if a revolving door is identified in the photographed image, the processor 130 may identify information on an edge corresponding to the revolving door based on this. The processor 130 may identify information on a moving space and information on a free space inside the revolving door based on the identified edge information. Also, the processor 130 may identify an object (for example, a person) that exists in the driving space based on the photographed image. For example, the processor 130 may identify an object that exists inside the revolving door or an object that is going to enter the revolving door. The processor 130 may also identify information on a moving route of an object that exists inside the revolving door or an object that is going to enter the revolving door based on the photographed image.

According to one or more embodiments, in the control method, a time point for the robot 100 to enter the revolving door may be identified based on the identified information on the free space and the identified information on the object in operation S330. According to one or more embodiments, if the processor 130 identifies that the identified information on the free space and the size of the robot 100 may be included in the free space inside the revolving door, the robot 100 may enter the free space inside the revolving door. The processor 130 may obtain information on a time section wherein the revolving door is opened based on the identified information on the free space, and identify a time point for the robot 100 to enter the revolving door based on the obtained information on the time section. In this case, the processor 130 may change a time point for the robot 100 to enter the revolving door based on the identified information on the object. For example, in case an object that exits or is going to exit the revolving door was identified, the processor 130 may identify a time point for the robot 100 to enter the revolving door as a time point after exit of the object was finished. Alternatively, in case an object that is going to enter the revolving door was identified, the processor 130 may identify a time point for the robot 100 to enter the revolving door as a time point after entry of the object was completed.

According to one or more embodiments, in the control method, the processor 130 may control the driver 120 such that the robot 100 enters the revolving door at the time point for it to enter the revolving door in operation S340.

According to one or more embodiments, the robot 100 may obtain information on the revolving door through a photographed image, and determine a time point for it to enter the revolving door by using the information. Based on a time point for the robot 100 to enter the revolving door being identified, the robot 100 may enter the revolving door and move, and reach a target point. In this case, the robot 100 may drive in consideration of an object that passes through or is going to pass through the revolving door. Accordingly, the robot 100 may pass through the revolving door safely in consideration of a person around the revolving door, and may reach a target point without bypassing the revolving door.

Figure 4:
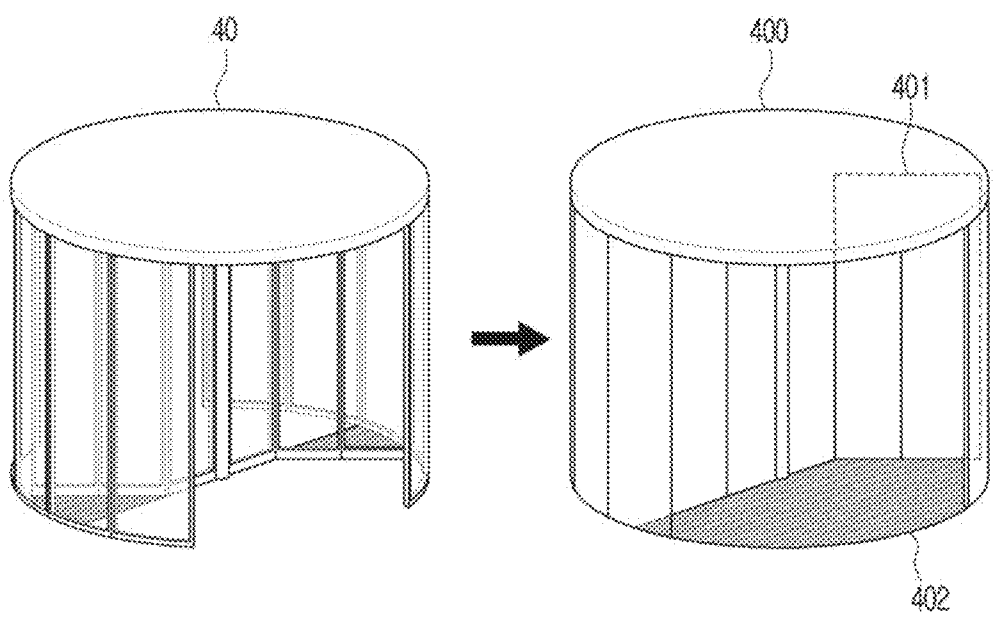
FIG. 4 is a diagram for illustrating information on an edge and information on a free space corresponding to a revolving door according to one or more embodiments.

FIG. 4 is a diagram for illustrating information on an edge and information on a free space corresponding to a revolving door according to one or more embodiments.

According to FIG. 4, the processor 130 may identify a revolving door 40 included in a photographed image according to one or more embodiments. Also, according to one or more embodiments, the processor 130 may identify a revolving door 40 included in a photographed image by using the trained neural network model stored in the memory. However, the disclosure is not limited thereto, and according to one or more embodiments, the processor 130 may identify a revolving door by using the location information of the robot 100 and the map information stored in the memory.

According to one or more embodiments, if a revolving door is identified in a photographed image, the processor 130 may identify edge information 400 corresponding to the identified revolving door. Also, according to one or more embodiments, the edge information corresponding to the revolving door may include the outline of the revolving door that exists in the photographed image. In this case, edge information 401 for a swing door included in the revolving door may also be included. According to one or more embodiments, the edge information may include a straight line or a curved line corresponding to a point wherein the revolving door 40 and the bottom inside the driving space meet, or include a straight line perpendicular to the bottom in the outline corresponding to the revolving door 40.

According to one or more embodiments, the processor 130 may identify information on a moving space and information on a free space corresponding to the revolving door based on the identified edge information 400. Also, according to one or more embodiments, the moving space 402 may be a space wherein a dynamic object including the robot 100 inside the revolving door moves to pass through the revolving door. The processor 130 may identify the moving space information based on the identified edge information 400. According to one or more embodiments, the processor 130 may identify an area excluding an area occupied by an object in the moving space 402 as a free space. Also, the processor 130 may identify the free space information based on the moving space information and the information on the object. As illustrated in FIG. 4, in case an object does not exist inside the revolving door, the moving space 402, depicted with shading, may be identical to the free space. The processor 130 may identify the information on the moving space 402 (or, the moving space information) as the free space information.

Figure 5:
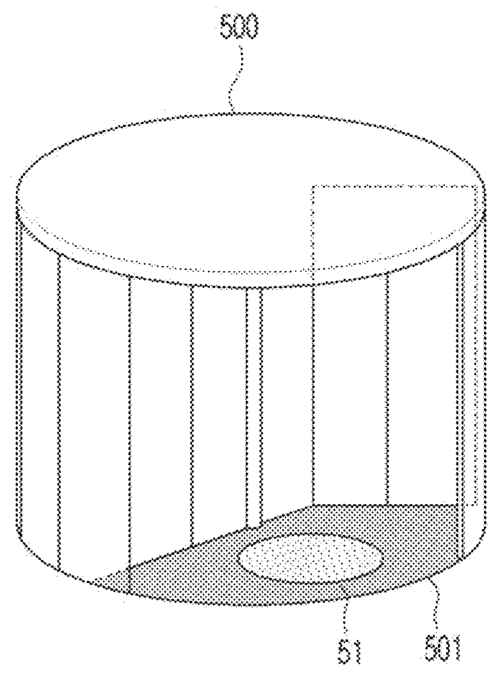
FIG. 5 is a diagram for illustrating a method of identifying a time point for a robot to enter a revolving door according to one or more embodiments.
Figure 5:
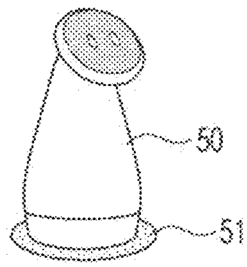

FIG. 5 is a diagram for illustrating a method of identifying a time point for a robot to enter a revolving door according to one or more embodiments.

According to FIG. 5, the processor 130 may identify a time point for the robot 50 to enter the revolving door based on information on the free space and information on the space corresponding to the robot 50 according to one or more embodiments. Here, the space information corresponding to the robot 50 may include information on the occupied space 51 (depicted in the lightly-shaded region) of the robot 50. According to one or more embodiments, the occupied space 51 of the robot 50 may include an area including a footprint area and a margin area of the robot 50. According to one or more embodiments, the information on the occupied space 51 of the robot 50 may include information on the shape and the size of the occupied space 51. Also, according to one or more embodiments, the space information corresponding to the robot 50 including the information on the occupied space 51 of the robot 50 may be stored in the memory.

According to one or more embodiments, if it is identified that the shape of the space corresponding to the robot 50 is included in the shape of the free space based on the free space information and the space information corresponding to the robot 50, the processor 130 may identify a time point for the robot 50 to enter the revolving door based on the location of the free space inside the revolving door. For example, the processor 130 may compare the shape of the free space 501 (depicted in the darkly-shaded region) included in the free space information identified previously and the shape of the occupied space 51 of the robot 50 included in the space information corresponding to the robot 50, and identify whether the shape of the space corresponding to the robot 50 (or, the occupied space 51 of the robot 50) is included in the shape of the free space 501. According to one or more embodiments, if it is identified that the shape of the space 51 corresponding to the robot 50 is included in the shape of the free space 501, the processor 130 may identify a time point for the robot 50 to enter the revolving door based on the location of the free space 501 inside the revolving door. For example, the processor 130 may identify a time section wherein the revolving door is opened based on the location of the free space 501 inside the revolving door, and identify a time point for the robot 50 to enter the revolving door within the time section wherein the revolving door is opened. Hereinafter, a method of identifying a time point for the robot 50 to enter the revolving door within a time section wherein the revolving door is opened will be described.

According to one or more embodiments, the processor 130 may identify a time section wherein the revolving door is opened based on the location information of the free space 501 and the moving speed information of the free space 501.

Also, according to one or more embodiments, the information on the free space may include at least one of information on a radius, information on a rotation axis, or information on an angle corresponding to the free space 501. For example, in case the free space 501 is in a fan shape, the processor 130 may obtain radius information and angle information corresponding to the free space 501 based on the edge information 500 corresponding to the identified revolving door. The processor 130 may also obtain information on the real time location change of the free space 501 based on the edge information 500, and obtain the rotation axis information corresponding to the free space 501 and the moving speed information of the free space 501 based on this. In this case, the moving speed information of the free space 501 may include at least one of linear velocity information or angular velocity information of the free space 501. According to one or more embodiments, if the location information of the free space 501 inside the revolving door and the moving speed information of the free space 501 are identified based on the free space information, the processor 130 may identify a time section wherein the revolving door is opened based on this. Based on a time section wherein the revolving door is opened being identified, the processor 130 may identify a time point for the robot 50 to enter the revolving door.

According to one or more embodiments, the robot 50 may determine whether the occupied space 51 may be included in the free space 501, and in case it is determined that the occupied space 51 may be included in the free space 501, the robot 50 may determine a time point for it to enter the revolving door.

Figure 6:
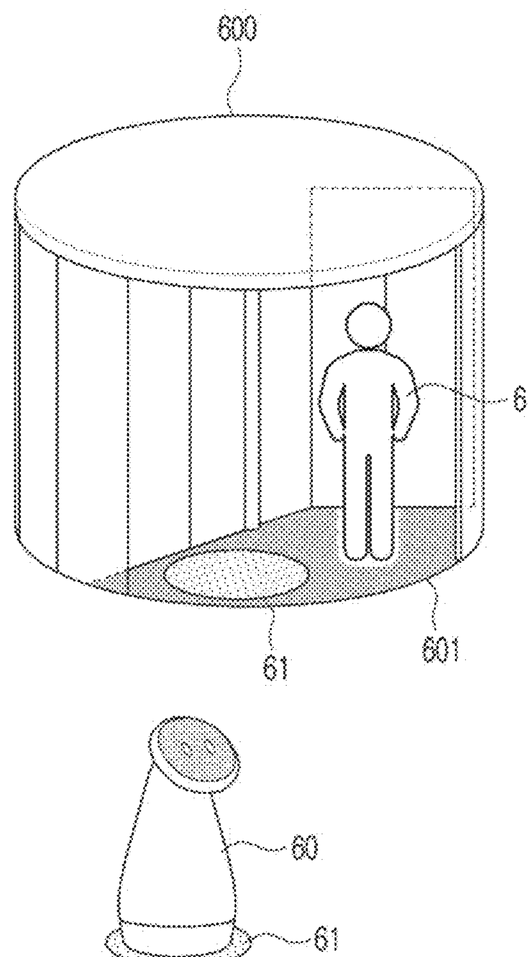
FIG. 6 is a diagram for illustrating a method of identifying a time point for a robot to enter a revolving door by considering an object according to one or more embodiments.

FIG. 6 is a diagram for illustrating a method of identifying a time point for a robot to enter a revolving door by considering an object according to one or more embodiments.

According to FIG. 6, the processor 130 may update the information on the free space 601 (depicted in the darkly-shared region) based on the information on the object 6 according to one or more embodiments.

According to one or more embodiments, the processor 130 may identify whether the object 6 is going to enter the revolving door based on the information on the object 6. According to one or more embodiments, the information on the object 6 may further include information on the moving route of the object 6. According to one or more embodiments, the information on the moving route of the object 6 may be information on a predicted moving route of the object 6 identified based on a photographed image. The processor 130 may identify whether the at least one object 6 is going to enter the revolving door based on the information on the moving route of the object 6. If it is identified that the at least one object 6 is going to enter the revolving door, the processor 130 may update the information on the free space 601 based on the space information corresponding to the object 6. The space information corresponding to the object 6 means information on the occupied space of the object 6, and according to one or more embodiments, the space information corresponding to the object 6 may be stored in the memory. The processor 130 may update the information on the free space 601 based on the space information corresponding to the object 6 stored in the memory. For example, the processor 130 may identify the area excluding the occupied space of the object 6 in the area corresponding to the moving space as the free space 601.

According to one or more embodiments, the processor 130 may identify whether the shape of the space corresponding to the robot 60 is included in the shape of the free space 601 based on the updated information on the free space 601 and the space information corresponding to the robot 60. Also, according to one or more embodiments, the processor 130 may compare the shape of the updated free space 601 and the shape of the occupied space 61 (depicted in the lightly-shaded region) corresponding to the robot 60, and identify whether the shape of the space corresponding to the robot 60 is included in the shape of the updated free space 601.

According to one or more embodiments, if it is identified that the shape of the space corresponding to the robot 60 is included in the shape of the updated free space 601, the processor 130 may identify a time point for the robot 60 to enter the revolving door based on the location of the updated free space 601 inside the revolving door. Also, according to one or more embodiments, the processor 130 may identify a time section wherein the revolving door is opened (or, a time section wherein the robot 60 may enter the revolving door) based on the information on the location of the updated free space 601. For example, the processor 130 may identify the moving speed of the free space 601 based on the location change of the updated free space 601 according to passage of time, and identify whether the revolving door is opened based on the edge information 600. The processor 130 may identify a time section wherein the revolving door is opened based on the moving speed information of the free space 601 and whether the revolving door is opened. The processor 130 may enter the revolving door within the time section wherein the revolving door is opened.

According to one or more embodiments, the processor 130 may identify a time point for the robot 60 to enter based on the number of at least one object 6 that is going to enter the revolving door and the entering location of the at least one object 6 inside the revolving door.

According to one or more embodiments, the processor 130 may identify the at least one object 6 that is going to enter the revolving door based on a photographed image. If the at least one object 6 that is going to enter the revolving door enters the revolving door, the processor 130 may identify the entering location of the at least one object 6 inside the revolving door. For example, a case wherein one person is going to enter the revolving door is assumed. The processor 130 may identify one object 6 that is going to enter the revolving door based on a photographed image. Based on the one object 6 entering the revolving door, the processor 130 may identify location information of the one object 6 inside the revolving door, and may update the information on the free space 601. The processor 130 may compare the shape of the updated free space 601 and the shape of the occupied space 61 corresponding to the robot 60, and identify whether the shape of the space corresponding to the robot 60 is included in the shape of the updated free space 601. If the shape of the space corresponding to the robot 60 is included in the shape of the updated free space 601, the processor 130 may identify a time section wherein the revolving door is opened, and may identify a time point for the robot 60 to enter the revolving door. In this case, in the time section wherein the revolving door is opened, the processor 130 may identify a time point for the robot 60 to enter the revolving door as a time point after the time point wherein the object 6 entered the revolving door.

According to one or more embodiments, the processor 130 may identify a time point for the robot 60 to enter the revolving door based on the number of at least one object 6 that is going to exit the revolving door and moving route information of the at least one object 6. According to one or more embodiments, a case wherein two objects 6 exist inside the revolving door is assumed. If it is identified that two objects 6 exist inside the revolving door based on a photographed image, the processor 130 may identify moving route information of the objects 6 inside the revolving door. If it is identified that the two objects 6 are going to exit the revolving door based on the moving route information of the objects 6, the processor 130 may update the information on the free space 601 based on this. For example, the processor 130 may identify a moving space including the occupied space corresponding to the objects 6 that are going to exit the revolving door as the free space 601. The processor 130 may identify whether the shape of the occupied space 61 of the robot 60 is included in the shape of the updated free space 601 based on the updated information on the free space 601. If the shape of the occupied space 61 of the robot 60 is included in the shape of the updated free space 601, the processor 130 may identify a time point for the robot 60 to enter the revolving door. The processor 130 may identify a time section wherein the revolving door is opened, and identify a time point for the robot 60 to enter the revolving door based on this. In this case, the processor 130 may identify the time point for the robot 60 to enter the revolving door as a time point after the time point wherein each of the two objects 6 exited the revolving door.

Figure 7A:
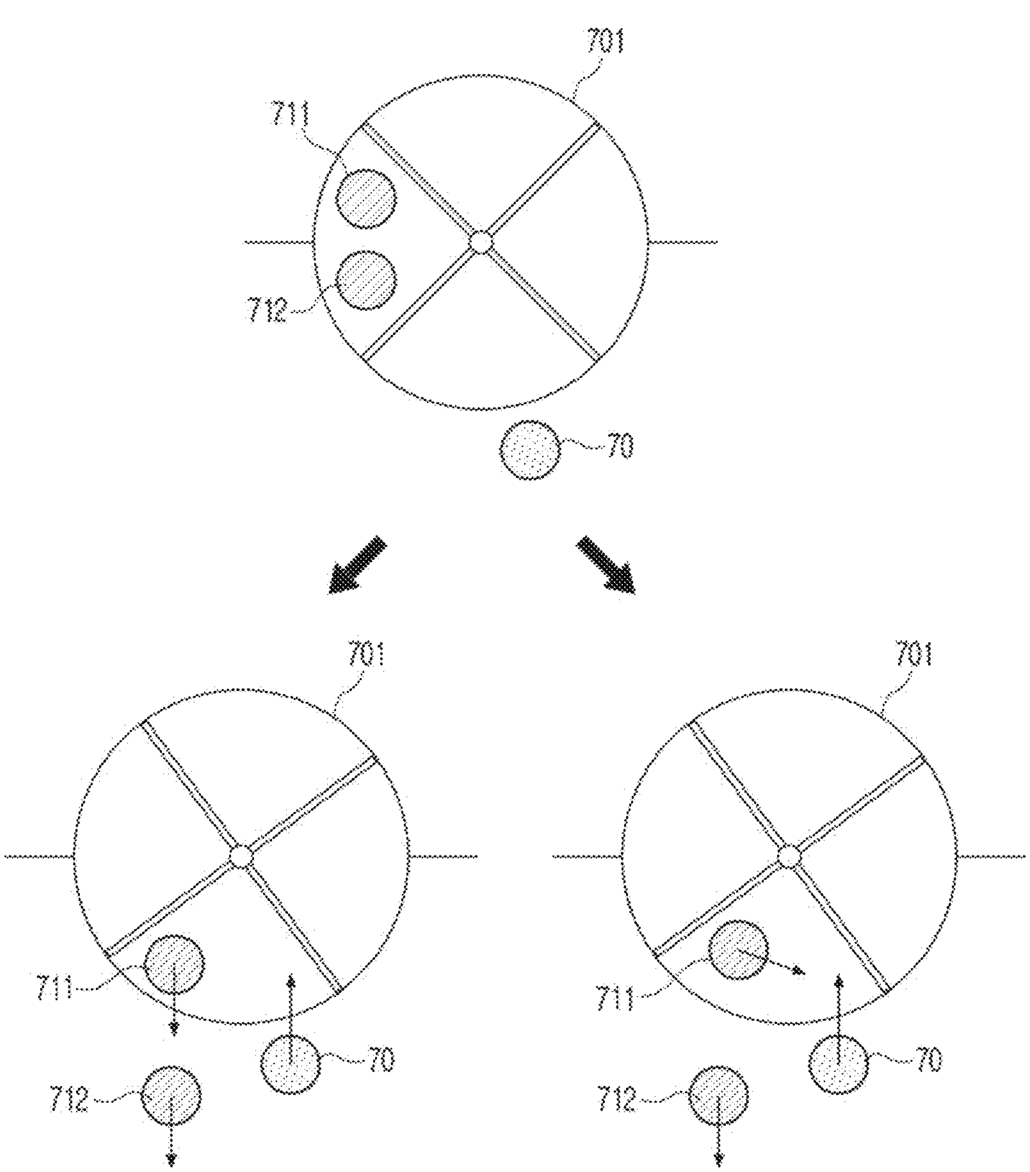
FIG. 7A to FIG. 7B are diagrams for illustrating a method of identifying a time point for a robot to enter a revolving door according to one or more embodiments.
Figure 7B:
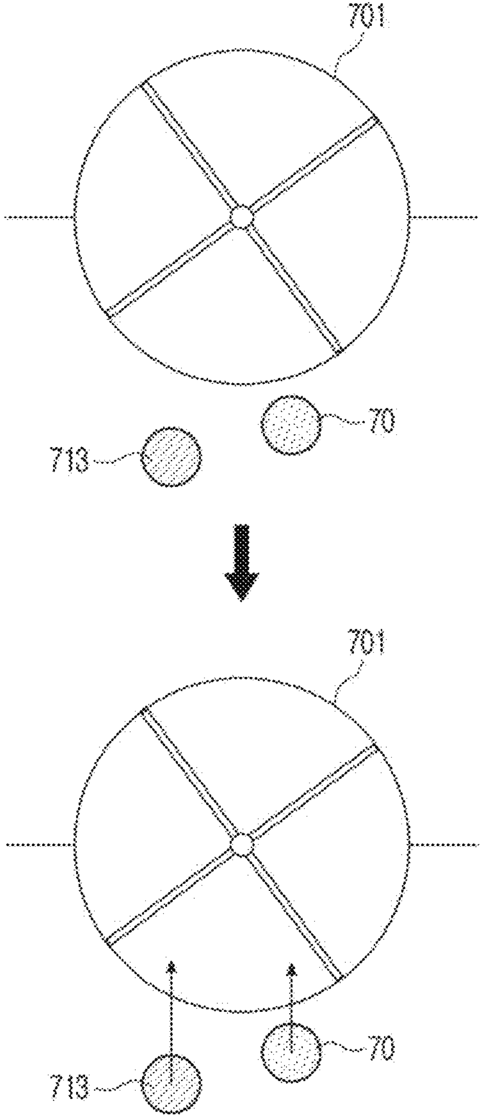

FIG. 7A to FIG. 7B are diagrams for illustrating a method of identifying a time point for a robot to enter a revolving door according to one or more embodiments.

According to FIG. 7A, the processor 130 may identify a time point for the robot to enter the revolving door based on information on an object according to one or more embodiments. Also, according to one or more embodiments, a case wherein a plurality of objects 711 and 712 are included inside the revolving door 701 as in the drawing on the upper side of FIG. 7A is assumed. The processor 130 may identify moving route information of the plurality of objects based on a photographed image.

According to one or more embodiments, as in the drawing on the left lower side of FIG. 7A, if it is identified that the plurality of objects 711 and 712 are going to exit the revolving door 701 based on the moving route information of the plurality of objects 711 and 712, the processor 130 may update the space including the occupied space of the plurality of objects 711 and 712 to a free space. The processor 130 may identify whether the shape of the space corresponding to the robot 70 is included in the shape corresponding to the updated free space based on the updated free space information. If the shape of the space corresponding to the robot 70 is included in the shape corresponding to the updated free space, the processor 130 may identify a time point for the robot 70 to enter the revolving door 701 based on the updated free space information. For example, the processor 130 may identify a time section wherein the revolving door 701 is opened based on the moving speed information and the edge information of the free space. Within the time section wherein the revolving door 701 is opened, the processor 130 may identify the time point for the robot 70 to enter the revolving door 701 as a time point after the time point wherein each of the two objects 711 and 712 exited the revolving door 701. In this case, the processor 130 may identify a time point when the two objects 711 and 712 complete exit from the revolving door 701 based on moving route information corresponding to each of the two objects 711 and 712, and identify the time point for the robot 70 to enter the revolving door 701 based on this. The time point when the objects complete exit from the revolving door 701 means a time point corresponding to a state wherein the robot 70 may enter the revolving door 701 without influence from the objects after the objects exited the revolving door 701.

According to one or more embodiments, as in the drawing on the right lower side of FIG. 7A, if it is identified that any one 712 of the plurality of objects 711 and 712 is going to exit the revolving door 701 based on the moving route information of the plurality of objects 711 and 712, the processor 130 may update the space including the occupied space of the any one object 712 to a free space. The processor 130 may identify whether the shape of the space corresponding to the robot 70 is included in the shape corresponding to the updated free space based on the updated free space information. If the shape of the space corresponding to the robot 70 is included in the shape corresponding to the updated free space, the processor 130 may identify a time point for the robot 70 to enter the revolving door based on the updated free space information. For example, the processor 130 may identify a time section wherein the revolving door 701 is opened based on the moving speed information and the edge information of the free space. Within the time section wherein the revolving door 701 is opened, the processor 130 may identify the time point for the robot 70 to enter the revolving door 701 as a time point after the time point wherein the any one object 712 exited the revolving door 701. In this case, the processor 130 may identify a time point when the any one object 712 completes exit from the revolving door 701 based on the moving route information corresponding to the any one object 712, and may identify the time point for the robot 70 to enter the revolving door 701 based on this.

According to one or more embodiments, the robot 70 may identify a time point for it to enter the revolving door in consideration of an object inside the revolving door. For example, the robot 70 may consider moving route information of an object inside the revolving door, and in case the object is going to exit the revolving door, the robot 70 may enter the revolving door at a time point after the object exited the revolving door, and thus usability is improved. However, the disclosure is not limited thereto, and according to one or more embodiments, in a first time section wherein the revolving door is opened, in case it is identified that the robot 70 may not enter the revolving door after a time point wherein an object exited the revolving door, the processor 130 may identify a time point for the robot 70 to enter the revolving door within a second time section after the first time section. According to one or more embodiments, a case wherein, after exit of an object is completed within the first time section wherein the revolving door is opened, it is identified that time for entry of the robot 70 is not secured is assumed. If it is identified that time for the robot 70 to enter the revolving door is not secured, the processor 130 may identify a time point for the robot 70 to enter the revolving door within the second time section wherein the revolving door is opened after the first time section.

According to FIG. 7B, the processor 130 may identify a time point for the robot 70 to enter the revolving door 701 based on information on objects 713 that are going to enter the revolving door 701 according to one or more embodiments. Also, according to one or more embodiments, as in the drawing on the upper side of FIG. 7B, a case wherein the objects 713 that are going to enter the revolving door 701 exist is assumed. The processor 130 may identify moving route information of the plurality of objects 713 based on a photographed image. If it is identified that the objects 713 are going to enter the revolving door 701 based on the identified moving route information, the processor 130 may update the area excluding the occupied space (or, the occupied area) of the objects 713 in the moving space inside the revolving door 701 to a free space. The processor 130 may identify whether the shape of the space corresponding to the robot 70 is included in the shape corresponding to the updated free space based on the updated free space information. If the shape of the space corresponding to the robot 70 is included in the shape corresponding to the updated free space, the processor 130 may identify a time point for the robot 70 to enter the revolving door 701 based on the updated free space information. According to one or more embodiments, as in the drawing on the lower side of FIG. 7B, the processor 130 may identify a time point for the robot 70 to enter the revolving door 701 for the robot 70 to enter the revolving door 701 after entry of the objects 713 that are going to enter the revolving door 701 is completed. For example, within a time section wherein the revolving door 701 is opened, the processor 130 may identify the time point for the robot 70 to enter the revolving door 701 as a time point after the time point wherein the objects 713 completed entry.

However, the disclosure is not limited thereto, and according to one or more embodiments, the processor 130 may identify the time point for the robot 70 to enter the revolving door 701 as a time point after the time point wherein the objects 713 completed entry not only in a case wherein the objects 713 are located on the rear side of the robot 70, but also a case wherein the objects 713 are located on the front side of the robot 70, as in the drawing on the upper side of FIG. 7B.

According to one or more embodiments, the processor 130 may control the driver 120 such that the robot 70 enters the revolving door 701 on the identified time point for the robot 70 to enter the revolving door 701.

Figure 8A:
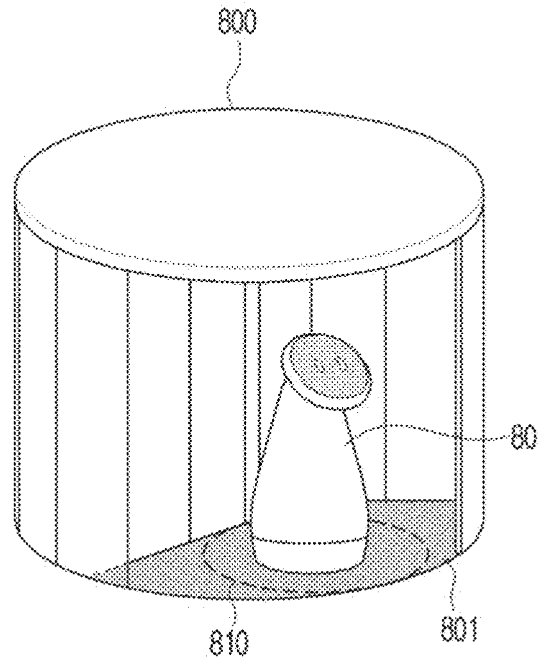
FIG. 8A and FIG. 8B are diagrams for illustrating a method of driving a robot inside a revolving door according to one or more embodiments.
Figure 8B:
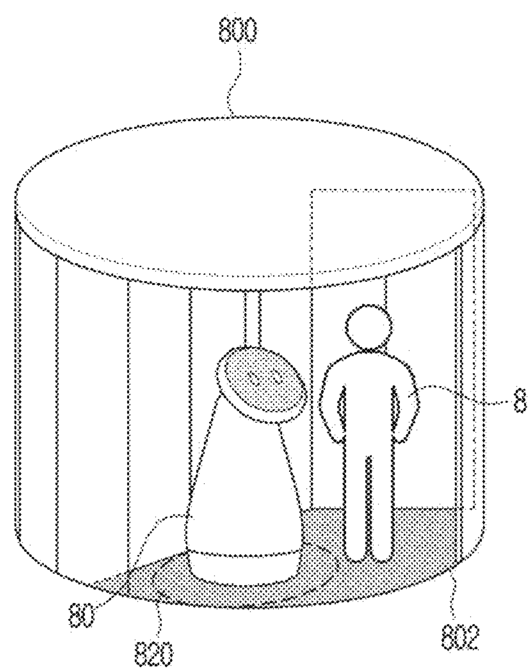

FIG. 8A and FIG. 8B are diagrams for illustrating a method of driving a robot inside a revolving door according to one or more embodiments.

According to FIG. 8A, according to one or more embodiments, if the robot 80 enters the revolving door, the processor 130 may control the driver 120 such that the robot 80 is located in a center area of an inscribed circle 810 corresponding to the free space 801 (depicted in the darkly-shaded region). The inscribed circle 810 corresponding to the free space 801 means a circle inscribed in the shape of the free space 801 (for example, a fan shape). Here, the center area means an area located within a predetermined distance from the center of the inscribed circle 810. According to one or more embodiments, if the robot 80 enters the revolving door within a time point for it to enter the revolving door, the processor 130 may control the driver 120 such that the robot 80 is located in the center area of the inscribed circle 810 based on information on the free space 801. Also, according to one or more embodiments, the information on the free space 801 may include at least one of information on a radius, information on a rotation axis, or information on an angle corresponding to the free space 801, and the processor 130 may identify at least one of the information on the radius, the information on the rotation axis, or the information on the angle corresponding to the free space 801 based on the edge information 800. The processor 130 may identify the center area of the inscribed circle 810 based on at least one of the information on the radius, the information on the rotation axis, or the information on the angle corresponding to the free space 801, and control the driver 120 such that the robot 80 is located in the identified center area of the inscribed circle 810. According to one or more embodiments, the processor 130 may identify real time location information of the free space 801 based on the edge information 800 obtained from a real time photographed image, and update the center area of the inscribed circle 810 in real time based on the real time location information. The processor 130 may control the driver 120 such that the robot 80 is located in the updated center area of the inscribed circle 810.

According to FIG. 8B, if the free space 802 (depicted in the darkly-shaded region) is updated in consideration of information on an object 8 according to one or more embodiments, the processor 130 may identify a center area of an inscribed circle 820 corresponding to the updated free space 802. Also, according to one or more embodiments, in case the object 8 exists inside the revolving door, the processor 130 may obtain the updated free space 802. The processor 130 may identify the center area of the inscribed circle 820 corresponding to the free space 802 by using at least one of information on a radius, information on a rotation axis, or information on an angle corresponding to the updated free space 802. The processor 130 may control the driver 120 such that the robot 80 is located in the center area of the inscribed circle 820 corresponding to the updated free space 802.

Figure 9:
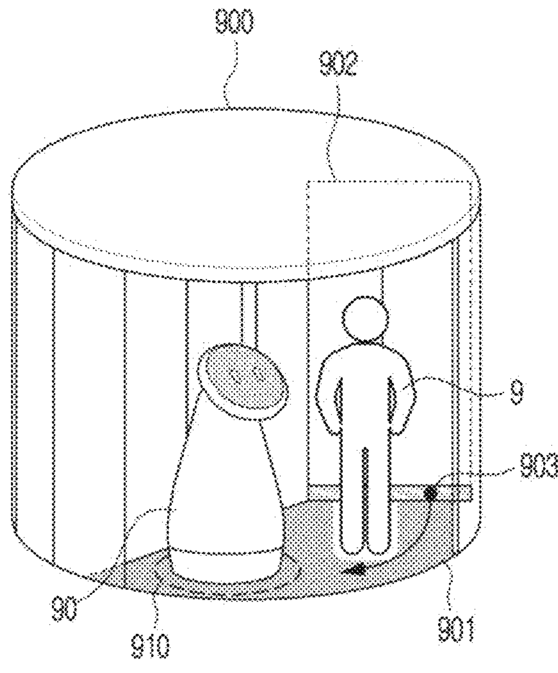
FIG. 9 is a diagram for illustrating a method for a robot to move inside a revolving door according to one or more embodiments.

FIG. 9 is a diagram for illustrating a method for a robot to move inside a revolving door according to one or more embodiments.

According to FIG. 9, the processor 130 may control the driver 120 such that the robot 90 moves to follow a reference point 903 corresponding to a swing door 902 included in the revolving door according to one or more embodiments. Here, the swing door 902 included in the revolving door means a static object 9 for dividing a plurality of moving spaces inside the revolving door. The reference point 903 means a point corresponding to a predetermined location within the swing door 902 in the edge information 900 corresponding to the swing door 902. For example, the reference point 903 may be a point located within a predetermined distance from the rotation axis among straight lines adjacent to the bottom in the edge information corresponding to the swing door 902, but is not limited thereto.

According to one or more embodiments, based on the robot 90 approaching the revolving door, the processor 130 may identify a predetermined reference point 903 inside the swing door 902 corresponding to the free space 901 (depicted in the darkly-shaded region). According to one or more embodiments, the processor 130 may identify the swing door 902 included in the revolving door based on edge information 900 obtained based on a photographed image. According to one or more embodiments, the swing door 902 corresponding to the free space 901 means a swing door 902 that is located prior to the robot 90 based on the rotating direction of the revolving door among a plurality of swing doors 902 adjacent to the free space 901. For example, in case the revolving door rotates relatively from the left to the right based on FIG. 9, the swing door 902 corresponding to the free space 901 may be the swing door 902 located on the right side of the robot 90 based on FIG. 9, which is relatively located prior to the robot 90. If the swing door 902 corresponding to the free space 901 is identified, the processor 130 may identify the predetermined reference point 903 inside the identified swing door 902.

According to one or more embodiments, based on the reference point 903 being identified, the processor 130 may control the driver 120 such that the robot 90 moves to follow the identified reference point 903. For example, the processor 130 may identify at least one of information on the location change or information on the moving speed of the reference point 903 based on a photographed image. The moving speed information of the reference point 903 may include at least one of linear velocity information or angular velocity information of the reference point 903. The processor 130 may move by using the moving speed information of the reference point 903. For example, the processor 130 may control the driver 120 such that the robot 90 moves identically to the moving speed and the moving direction of the identified reference point 903. However, the disclosure is not limited thereto, and according to one or more embodiments, the processor 130 may control the driver 120 such that the robot 90 moves in consideration of each of the reference point 903 and the center area of the inscribed circle 910.

According to one or more embodiments, the processor 130 may identify third control information by applying a predetermined weight to each of the first control information for the robot 90 to be located in the center of the inscribed circle 910 corresponding to the free space 901 and the second control information for the robot 90 to move to follow the identified reference point 903, and control the driver 120 based on the identified third control information.

According to one or more embodiments, the processor 130 may identify the first control information for the robot 90 to be located in the center of the inscribed circle 910 corresponding to the free space 901, and identify the second control information for the robot 90 to move to follow the identified reference point 903. For example, the processor 130 may identify the first control information for the robot 90 to be located within a predetermined distance from the center area of the identified inscribed circle 901. Also, the processor 130 may identify the second control information for the robot 90 to move to follow the identified reference point 903 based on the edge information 900.

According to one or more embodiments, the processor 130 may identify the third control information for the robot 90 to move inside the revolving door by applying the predetermined weight to each of the identified first control information and second control information, and control the driver 120 based on the identified third control information. For example, the processor 130 may identify the third control information by using the following formula 1.

$$v, w = \underset{v,w}{\arg\min}\,(a \times \text{cost}(A) + b \times \text{cost}(B)) \quad \text{[Formula 1]}$$

According to the formula 1, v means the linear velocity of the robot 90, and w means the angular velocity of the robot 90. Also, a means a weight corresponding to the first control information, and b means a weight corresponding to the second control information. The sum of a and b is 1. Cost(A) means a distance value between the center of the inscribed circle 910 and the location of the robot 90 (e.g., a distance error value from the center of the inscribed circle 910). Cost(B) means a distance value (or, a distance error value) between the expected location of the robot 90 inside the free space 901 and the current location of the robot 90 in case the robot 90 follows the reference point 903. The processor 130 may identify the linear velocity and the angular velocity of the robot 90 by using the formula 1, and identify the third control information for the robot 90 to move based on the identified linear velocity and angular velocity. The processor 130 may control the driver 120 by using the third control information.

Figure 10:
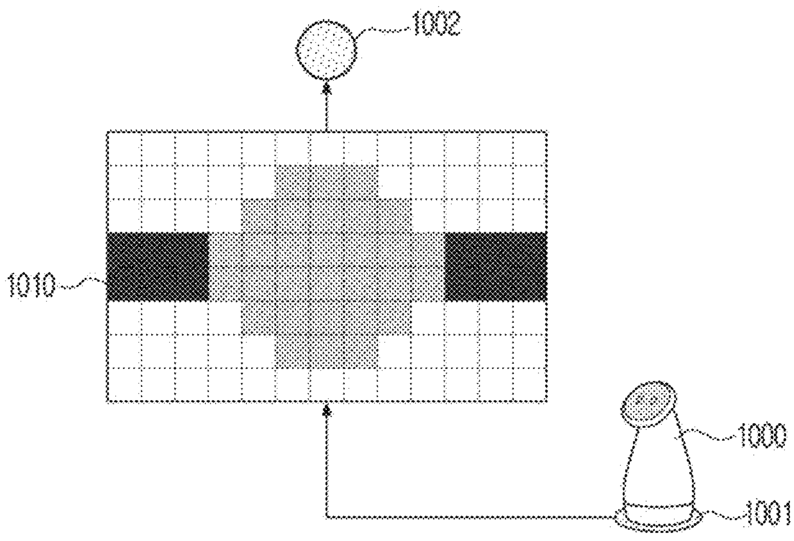
FIG. 10 is a diagram for illustrating a method for a robot to move to a target location according to one or more embodiments.

FIG. 10 is a diagram for illustrating a method for a robot to move to a target location according to one or more embodiments.

According to FIG. 10, if it is identified that the robot 1000 is located within a predetermined distance from the revolving door according to one or more embodiments, the processor 130 may control the driver 120 such that the robot 1000 enters the revolving door at a time point for it to enter the revolving door. According to one or more embodiments, in the memory, map information corresponding to a driving space may be stored. Also, according to one or more embodiments, in the map information corresponding to the driving space, map information 1010 corresponding to the revolving door may be included. The processor 130 may identify location information 1001 of the robot 1000 through the sensor, and identify whether the robot 1000 is located within the predetermined distance from the revolving door based on the identified location information 1001 and the map information. If it is identified that the robot 1000 is located within the predetermined distance from the revolving door, the processor 130 may identify a time point for the robot 1000 to enter the revolving door, and control the driver 120 such that the robot 1000 enters the revolving door on the identified time point for it to enter the revolving door. After the robot 1000 entered the revolving door, the processor 130 may control the driver 120 such that the robot 1000 exits the revolving door, and the robot 1000 may reach a target location 1002. Here, the target location 1002 may be any one of a plurality of intermediate target points included in the driving route, and according to one or more embodiments, the target location 1002 may be an intermediate target point adjacent to the revolving door among the plurality of intermediate target points included in the driving route.

Figure 11A:
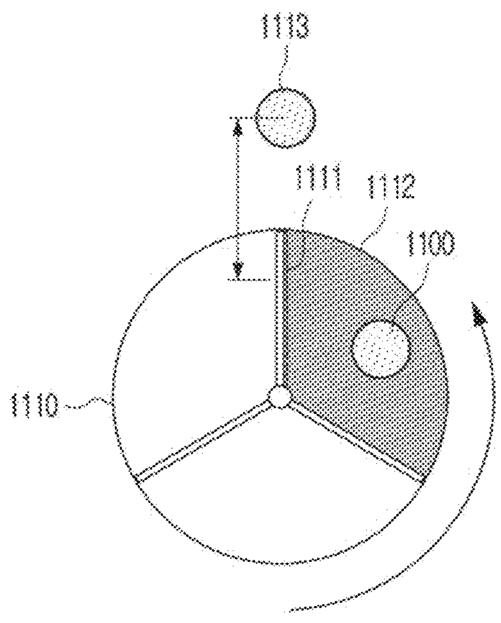
FIG. 11A and FIG. 11B are diagrams for illustrating a method for a robot to exit a revolving door according to one or more embodiments.
Figure 11B:
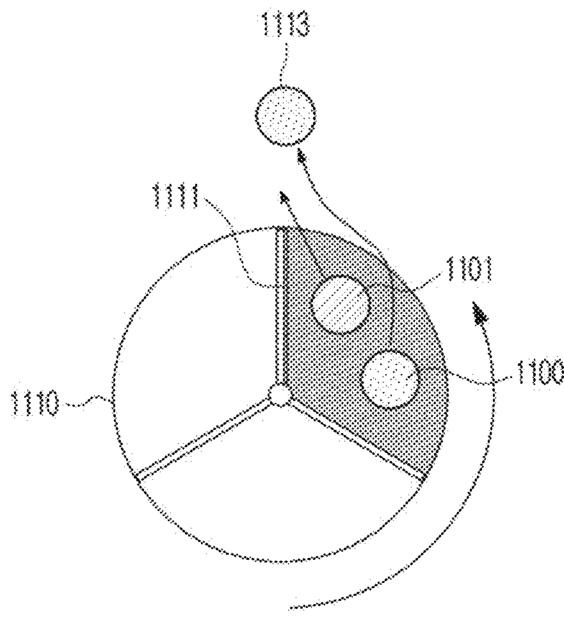

FIG. 11A and FIG. 11B are diagrams for illustrating a method for a robot to exit a revolving door according to one or more embodiments.

According to FIG. 11A, the processor 130 may control the driver 120 such that the robot 1100 exits the revolving door 1110 according to one or more embodiments. Also, according to one or more embodiments, for the robot 1100 to enter the revolving door 1110, the processor 130 may identify whether the swing door 1111 corresponding to the free space 1112 is located within a predetermined distance from a target location 1113 outside the revolving door 1110. The processor 130 may identify the location information of the swing door 1111 corresponding to the free space 1112 based on a photographed image, and obtain distance information between the swing door 1111 and a target location 1113 outside the revolving door 1110 based on the identified location information of the swing door 1111. For example, if the swing door 1111 and the target location 1113 inside the identified photographed image are identified, the processor 130 may identify the distance between the identified swing door 1111 and target location 1113.

The processor 130 may identify the location of the swing door 1111 based on the moving speed information of the free space 1112. For example, as the moving speed of the swing door 1111 and the moving speed of the free space 1112 are identical, the processor 130 may predict the location of the swing door 1111 by using the moving speed of the free space 1112. The processor 130 may identify the distance between the swing door 1111 and the target location 1113 by comparing the predicted location and the target location 1113. The processor 130 may identify the distance between the swing door 1111 and the target location 1113 by using the map information corresponding to the driving space stored in the memory.

According to one or more embodiments, the processor 130 may control the driver 120 such that the robot 1100 exits the revolving door 1110 within a predetermined time from the time point wherein the swing door 1111 corresponding to the free space 1112 is located within the predetermined distance from the target location 1113 outside the revolving door 1110. Also, according to one or more embodiments, the predetermined time may be time for the robot 1100 to exit the revolving door 1110 safely. The size of the predetermined time may be smaller than the size of the time section wherein the inlet of the revolving door 1110 is opened.

According to FIG. 11B, the processor 130 may control the driver 120 such that the robot 1100 exits the revolving door 1110 based on information on an object 1101 according to one or more embodiments. Also, according to one or more embodiments, the processor 130 may identify whether at least one object 1101 located within the revolving door 1110 exits the revolving door 1110. For example, the processor 130 may identify whether the at least one object 1101 located inside the revolving door 1110 exits the revolving door 1110 by using information on the moving route of the object 1101 included in the information on the object 1101.

According to one or more embodiments, if it is identified that the at least one object 1101 exited the revolving door 1110, the processor 130 may control the driver 120 such that the robot 1100 exits the revolving door 1110 within a predetermined time from the time point when the swing door was identified to be located within the predetermined distance from the target location 1113. For example, in case it is identified that the object 1101 inside the revolving door 1110 exited the revolving door 1110 based on an obtained photographed image or the moving route information of the object 1101, the processor 130 may control the driver 120 such that the robot 1100 exits the revolving door 1110 within the predetermined time from the time point when the swing door was identified to be located within the predetermined distance from the target location 1113.

In this case, the time point for the robot 1100 to exit the revolving door 1110 may be a time point after the time point wherein the object 1101 exited the revolving door 1110. For example, if it is identified that the object 1101 inside the revolving door 1110 exited the revolving door 1110, the processor 130 may control the driver 120 such that the robot 1100 exits the revolving door 1110 within a predetermined time from a relatively later time point from among a first time point when the object 1101 completed exit from the revolving door 1110 and a second time point when the swing door was identified to be located within the predetermined distance from the target location 1113.

According to one or more embodiments, in case it is identified that the inlet of the revolving door 1110 is closed (or, in case it is identified that the robot 1100 will not be able to exit the revolving door 1110) before the predetermined time passes from the relatively later time point from among the first time point and the second time point when the swing door was identified to be located within the predetermined distance from the target location 1113, the processor 130 may control the driver 120 such that the robot 1100 exits the revolving door 1110 within the predetermined time from a third time point when the swing door was identified to be located within the predetermined distance from the target location 1113 after the time point when the inlet of the revolving door 1110 was closed. If the processor 130 determined that it would be difficult for the robot 1100 to exit the revolving door 1110 before the revolving door 1110 is closed after the object 1101 exited, the robot 1100 may exit the revolving door 1110 after the swing door was identified again to be located within the predetermined distance from the target location 1113 after the revolving door 1110 was closed.

Figure 12:
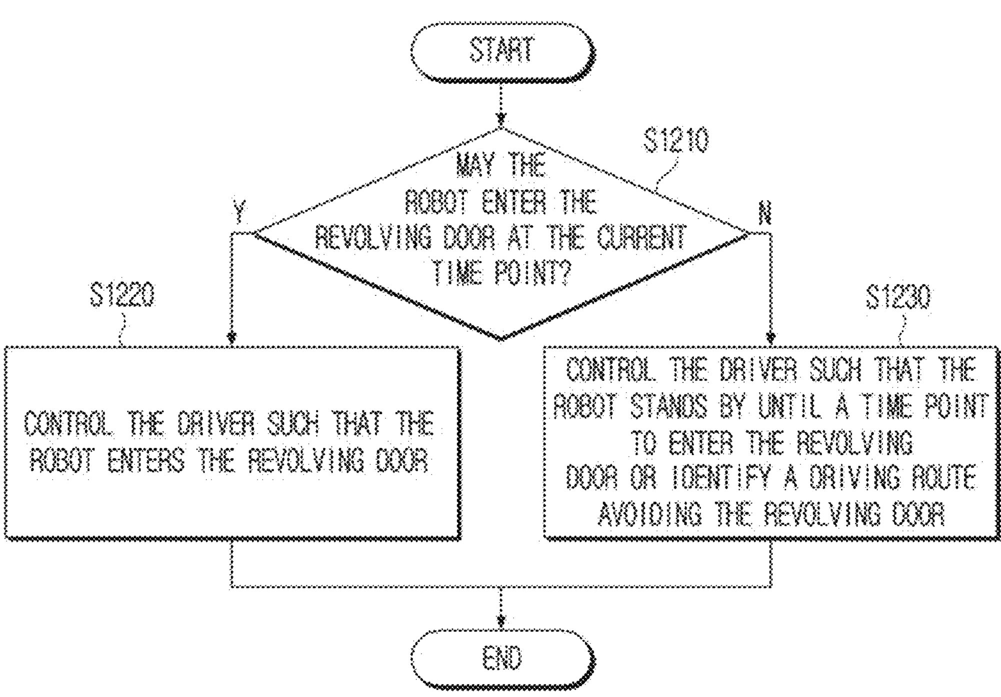
FIG. 12 is a flow chart for illustrating a method of identifying whether a robot may enter a revolving door according to one or more embodiments.

FIG. 12 is a flow chart for illustrating a method of identifying whether a robot may enter a revolving door according to one or more embodiments.

According to FIG. 12, first, in the control method, it may be determined whether the robot may enter the revolving door on the current time point in operation S1210. According to one or more embodiments, the processor 130 may determine whether the robot may enter the revolving door on the current time point based on an obtained photographed image. For example, the processor 130 may compare the shape of the free space included in free space information and the shape of the occupied space of the robot 100, and if it is identified that the shape of the occupied space of the robot 100 is included in the shape of the free space, the processor 130 may determine that the robot 100 may enter the revolving door on the current time point.

The processor 130 may compare the shape of the free space included in free space information and the shape of the occupied space of the robot 100, and if it is identified that the shape of the occupied space of the robot 100 is not included in the shape of the free space, the processor 130 may determine that the robot 100 may not enter the revolving door on the current time point. However, the disclosure is not limited thereto, and for example, in case objects in a predetermined number or more are included in the revolving door (for example, in case people in a predetermined number or more boarded inside the revolving door), the processor 130 may determine that the robot 100 may not enter the revolving door on the current time point.

According to one or more embodiments, in the control method, if it is determined that the robot 100 may enter the revolving door on the current time point in operation S1210: Y, the processor 130 may control the driver 120 such that the robot 100 enters the revolving door in operation S1220.

According to one or more embodiments, in the control method, if it is determined that the robot 100 may not enter the revolving door on the current time point in operation S1210:N, the processor 130 may control the driver 120 such that the robot 100 stands by until a time point for the robot 100 to enter the revolving door, or identify a driving route avoiding the revolving door in operation S1230. According to one or more embodiments, if it is identified that objects in a predetermined number or more are included in the revolving door, the processor 130 may determine that the robot 100 may not enter the revolving door on the current time point, and control the driver 120 such that the robot 100 stands by until a time point for the robot 100 to enter the revolving door. After the predetermined time passed from the current time point, the processor 130 may compare the shape of the free space included in the free space information and the shape of the occupied space of the robot 100, and re-identify whether the shape of the occupied space of the robot 100 is included in the shape of the free space. If it is identified that the driving time is reduced in the case of driving to avoid the revolving door, the processor 130 may identify a driving route avoiding the revolving door, and control the driver 120 such that the robot 100 drives to avoid the revolving door.

Figure 13:
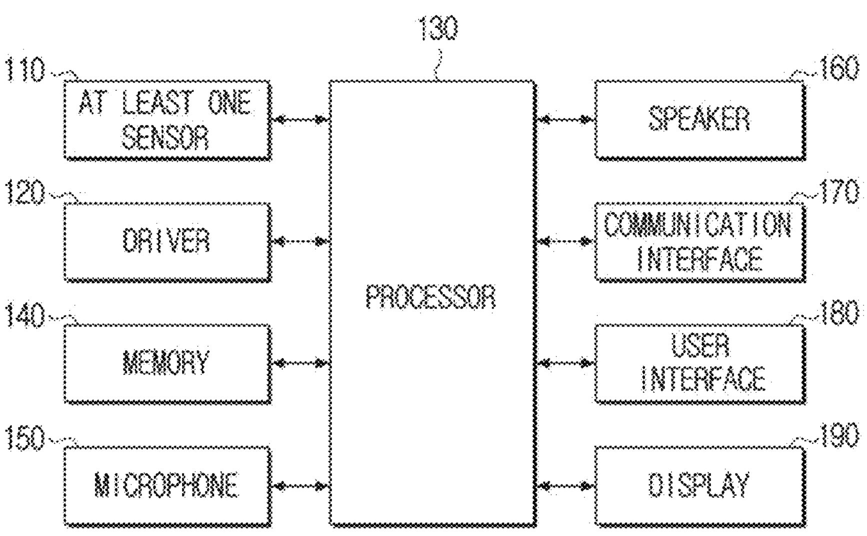
FIG. 13 is a block diagram illustrating a configuration of a robot according to one or more embodiments.

FIG. 13 is a block diagram illustrating a configuration of a robot according to one or more embodiments.

According to FIG. 13, the robot 100' may include at least one sensor 110, a driver 120, at least one processor 130, a memory 140, a microphone 150, a speaker 160, a communication interface 170, a user interface 180, and a display 190. Among the components illustrated in FIG. 13, regarding components overlapping with the components illustrated in FIG. 2, descriptions relating to FIG. 2 may be applied.

The memory 140 may store data according to one or more embodiments. The memory 140 may be implemented in the form of a memory 140 embedded in the robot 100', or implemented in the form of a memory 140 that may be attached to or detached from the robot 100', according to the usage of stored data. For example, in the case of data for operating the robot 100', the data may be stored in a memory 140 embedded in the robot 100', and in the case of data for an extended function of the robot 100', the data may be stored in a memory 140 that may be attached to or detached from the robot 100'.

In the case of a memory 140 embedded in the robot 100', the memory 140 may be implemented as at least one of a volatile memory 140 (for example, a dynamic RAM (DRAM), a static RAM (SRAM), or a synchronous dynamic RAM (SDRAM), for example) or a non-volatile memory 140 (for example, a one time programmable ROM (OTPROM), a programmable ROM (PROM), an erasable and programmable ROM (EPROM), an electrically erasable and programmable ROM (EEPROM), a mask ROM, a flash ROM, a flash memory 140 (for example, NAND flash or NOR flash, for example), a hard drive, or a solid state drive (SSD)). Also, in the case of a memory 140 that may be attached to or detached from the robot 100', the memory may be implemented in forms such as a memory 140 card (for example, compact flash (CF), secure digital (SD), micro secure digital (Micro-SD), mini secure digital (Mini-SD), extreme digital (xD), or a multi-media card (MMC), for example) and an external memory 140 that may be connected to a USB port (for example, a USB memory), for example.

According to one or more embodiments, in the memory 140, a trained neural network model and control information corresponding to each of a plurality of walking steps may be stored.

The robot 100' according to one or more embodiments may include a plurality of artificial intelligence models (or artificial neural network models or learning network models) consisting of at least one neural network layer. The artificial neural network may include a deep neural network (DNN), and for example, there are a convolutional neural network (CNN), a recurrent neural network (RNN), a restricted Boltzmann machine (RBM), a deep belief network (DBN), a bidirectional recurrent deep neural network (BRDNN), or deep Q-networks, for example, but the artificial neural network in the disclosure is not limited to the aforementioned examples.

The microphone 150 may mean a model that obtains a sound and converts the sound into an electric signal, and it may be a condenser microphone, a ribbon microphone, a moving coil microphone, a piezoelectric element microphone, a carbon microphone, and a micro electro mechanical system (MEMS) microphone. Also, the microphone 150 may be implemented by methods such as a non-directional method, a bi-directional method, a uni-directional method, a sub cardioid method, a super cardioid method, and a hyper cardioid method.

The speaker 160 may consist of a tweeter for reproducing sounds of high-pitched ranges, a mid-range for reproducing sounds of mid-pitched ranges, a woofer for reproducing sounds of low-pitched ranges, a sub-woofer for reproducing sounds of extreme low-pitched ranges, an enclosure for controlling resonances, and a crossover network dividing frequencies of electric signals input into the speaker 160 by each band.

The speaker 160 may output an acoustic signal to the outside of the robot 100'. The speaker 160 may output reproduction of multimedia, reproduction of recording, various types of notification sounds, or voice messages, for example. The robot 100' may include an audio output device such as the speaker 160, but may also include an output device such as an audio output terminal. The speaker 160 may provide obtained information, information processed-produced based on the obtained information, or a response result or an operation result for a user voice, for example, in voice forms.

The communication interface 170 may input and output various types of data. For example, the communication interface 170 may transmit and receive various types of data with an external device (for example, a source device), an external storage medium (for example, a USB memory), and an external server (for example, a webhard) through communication methods such as Wi-Fi based on AP (Wi-Fi, a Wireless LAN Network), Bluetooth, Zigbee, a wired/wireless Local Area Network (LAN), a Wide Area Network (WAN), Ethernet, IEEE 1394, a High-Definition Multimedia Interface (HDMI), a Universal Serial Bus (USB), a Mobile High-Definition Link (MHL), Audio Engineering Society/European Broadcasting Union (AES/EBU), or Optical, Coaxial, for example.

According to one or more embodiments, the communication interface 170 may include a Bluetooth Low Energy (BLE) module. The BLE means a Bluetooth technology enabling transmission and reception of data of lower power and low capacity in a 2.4 GHz frequency band having a reach radius of approximately 10 m.

However, the disclosure is not limited thereto, and the communication interface 170 may include a Wi-Fi communication module. For example, the communication interface 170 may include at least one of a Bluetooth Low Energy (BLE) module or a Wi-Fi communication module.

The user interface 180 is a component for the robot 100' to perform interaction with a user. For example, the user interface 180 may include at least one of a touch sensor, a motion sensor, buttons, a jog dial, a switch, a microphone, or a speaker, but is not limited thereto.

The display 190 may be implemented as a display including self-emitting diodes or a display including non-self-emitting diodes and a backlight. For example, the display 190 may be implemented as various forms of displays such as a liquid crystal display (LCD), an organic light-emitting diodes (OLED) display, light-emitting diodes (LED), micro LED, mini LED, a plasma display panel (PDP), a quantum dot (QD) display, or quantum dot light-emitting diodes (QLED), for example. In the display 190, driving circuits that may be implemented in forms such as an a-si TFT, a low temperature poly silicon (LTPS) TFT, an organic TFT (OTFT), for example, and a backlight unit, for example, may also be included. The display 190 may be implemented as a touch screen combined with a touch sensor, a flexible display, a rollable display, a 3D display, or a display to which a plurality of display modules are physically connected, for example. The processor 130 may control the display 190 to output an output image obtained according to one or more embodiments. Here, an output image may be a high resolution image of greater than or equal to 4K or 8K.

According to one or more embodiments, the display 190 may be implemented as a display of which angle may be adjusted. Also, according to one or more embodiments, on one side of the display 190, the driver 120 for adjusting the angle of the display 190 may be provided, and the processor 130 may adjust the display angle of the display 190 through the driver 120.

According to one or more embodiments, the robot 100' may obtain information on the revolving door through a photographed image, and determine a time point for it to enter the revolving door based on the information. Based on the time point for the robot 100' to enter the revolving door being identified, the robot 100' may enter the revolving door and move, and reach a target point. In this case, the robot 100' may drive in consideration of an object that passes through or is going to pass through the revolving door. Accordingly, the robot 100' may pass through the revolving door safely in consideration of a person around the revolving door, and may reach the target point without bypassing the revolving door.

FIG. 14 is a block diagram for illustrating a control method of a robot according to one or more embodiments.

According to FIG. 14, the robot 100 may include a revolving door identification module 1405, an edge information identification module 1410, an object information identification module 1415, a free space information identification module 1420, a module identifying a time point for entry into a revolving door 1425, a module identifying a moving route inside a revolving door 1430, a first control information identification module 1435, a second control information identification module 1440, a module identifying a time point of exiting a revolving door 1445, and a target location driving module 1450 according to one or more embodiments.

According to one or more embodiments, the revolving door identification module 1405 may identify a revolving door inside a driving space based on a photographed image obtained through the sensor 110. According to one or more embodiments, the revolving door may include at least one swing door, and include a plurality of boarding spaces. According to one or more embodiments, the robot 100 may obtain a photographed image corresponding to a driving space through the sensor 110, and the revolving door identification module 1405 may identify a revolving door existing in the obtained photographed image by using a trained neural network model. According to one or more embodiments, the trained neural network model may be a neural network model that was trained to receive input of a photographed image for a driving space, and output information regarding whether a revolving door exists in the photographed image.

According to one or more embodiments, the edge information identification module 1410 may identify edge information corresponding to a revolving door based on a photographed image obtained through sensor 110. The edge information corresponding to the revolving door is information on the contour line (or, the outline) of the revolving door that exists in the photographed image. However, the disclosure is not limited thereto, and the edge information may be information on a line that was calculated based on a pixel value inside the photographed image. According to one or more embodiments, the edge information may include a straight line or a curved line corresponding to a point wherein the revolving door and the bottom inside the driving space meet, or include a straight line perpendicular to the bottom in the outline corresponding to the revolving door. According to one or more embodiments, if a revolving door inside a driving space is identified, the edge information identification module 1410 may identify edge information corresponding to the revolving door based on the obtained photographed image.

According to one or more embodiments, the object information identification module 1415 may identify information on an object corresponding to a revolving door based on an obtained photographed image. Also, according to one or more embodiments, the object corresponding to the revolving door may include an object that entered the revolving door or an object that is going to enter the revolving door. The information on the object may include information on a moving route of the object. The object information identification module 1415 may identify or predict a moving route of the object by using a photographed image that is obtained in real time.

According to one or more embodiments, the free space information identification module 1420 may identify information on a free space inside a revolving door based on edge information and object information corresponding to the revolving door.

According to one or more embodiments, if edge information corresponding to a revolving door is identified based on a photographed image, the free space information identification module 1420 may identify an area for an object to board inside the revolving door based on the identified edge information, and identify the area as a moving space. The moving space may be an area excluding an area corresponding to a swing door in the bottom area of the revolving door (the area wherein the revolving door and the bottom inside the driving space meet), and according to one or more embodiments, the free space information identification module 1420 may identify the area excluding the area occupied by the object in the identified moving space as a free space based on the object information. The free space information identification module 1420 may identify an area that excluded an area including a predetermined margin area in the area occupied by the object from the moving space as the free space.

According to one or more embodiments, information on a free space may include information on a location and information on a moving speed corresponding to a free space inside a revolving door. The free space information identification module 1420 may identify the free space information including the location information and the moving speed information corresponding to the free space based on an obtained photographed image. For example, in case the free space is a space in a fan shape, the free space information identification module 1420 may identify at least one of information on a radius, information on a rotation axis, or information on an angle corresponding to the free space based on an obtained photographed image, and identify the free space information including the location information and the moving speed information corresponding to the free space based on this. The location information corresponding to the free space may be information on a relative location of the free space inside the driving space, and the moving speed information may be information on the moving speed of the free space (for example, at least one of linear velocity information or angular velocity information of the free space) according to passage of time.

According to one or more embodiments, the module identifying a time point for entry into a revolving door 1425 may identify a time point for the robot to enter the revolving door based on information on a free space and information on an object. For example, if location information of a free space inside the revolving door and moving speed information of the free space are identified, the module identifying a time point for entry into a revolving door 1425 may identify a time point for the robot to enter the revolving door based on the location information of the free space, the moving speed information of the free space, and information on an identified object.

According to one or more embodiments, the module identifying a time point for entry into a revolving door 1425 may identify a time section wherein a revolving door is opened based on the identified location information of the free space and moving speed information of the free space. For example, in case the free space is a fan shape, the module identifying a time point for entry into a revolving door 1425 may identify a time section wherein the revolving door is opened based on the location information of the free space inside the driving space and the angular velocity information of the free space, and identify a time point for the robot 100 to enter the revolving door based on information on the obtained time section.

According to one or more embodiments, the module identifying a time point for entry into a revolving door 1425 may update a time point for the robot 100 to enter a revolving door based on information on an object corresponding to the revolving door. For example, in case an object that exits or going to exit the revolving door was identified, the module identifying a time point for entry into a revolving door 1425 may update the time point for the robot 100 to enter the revolving door to a time point after exit of the object that exits or is going to exit the revolving door is completed. In case an object that is going to enter the revolving door was identified, the module identifying a time point for entry into a revolving door 1425 may identify the time point for the robot 100 to enter the revolving door as a time point after entry of the object that is going to enter the revolving door is completed. According to one or more embodiments, the module identifying a time point for entry into a revolving door 1425 may control the driver 120 such that the robot 100 enters the revolving door at the time point for it to enter the revolving door.

According to one or more embodiments, if the robot 100 enters a revolving door, the module identifying a moving route inside a revolving door 1430 may identify a moving route of the robot 100 based on a moving route and a moving speed of a swing door inside the revolving door, and control the driver 120 such that the robot 100 moves based on the identified moving route. Also, according to one or more embodiments, the module identifying a moving route inside a revolving door 1430 may identify a moving route of the robot 100 inside the revolving door based on the first control information received from the first control information identification module 1435 and the second control information received from the second control information identification module 1440.

According to one or more embodiments, if the robot 100 enters a revolving door, the first control information identification module 1435 may identify the first control information for the robot 100 to be located in a center area of an inscribed circle corresponding to a free space. The inscribed circle corresponding to the free space means a circle inscribed in the shape of the free space (for example, a fan shape), and the center area means an area located within a predetermined distance from the center of the inscribed circle. The first control information identification module 1435 may identify the center area of the inscribed circle based on at least one of information on a radius, information on a rotation axis, or information on an angle corresponding to the free space, and identify the first control information for the robot 100 to be located in the identified center area of the inscribed circle. According to one or more embodiments, the first control information identification module 1435 may update the center area of the inscribed circle of the free space in real time based on edge information obtained from a photographed image obtained in real time.

According to one or more embodiments, the second control information module 1440 may identify a moving route and a moving speed of a swing door inside a revolving door, and identify the second control information for the robot 100 to move based on the identified moving route and moving speed of the swing door.

According to one or more embodiments, the second control information module 1440 may identify the second control information for the robot 100 to move to follow a reference point corresponding to a swing door included in a revolving door. The reference point means a point corresponding to a predetermined location inside the swing door in the edge information corresponding to the swing door. For example, the reference point may be a point located within a predetermined distance from the rotation axis in a straight line adjacent to the bottom inside the swing door, but is not limited thereto. According to one or more embodiments, the second control information module 1440 may identify the second control information for the robot 100 to move in the moving route and the moving speed of the identified reference point.

According to one or more embodiments, the module identifying a moving route inside a revolving door 1430 may identify the third control information for the robot 100 to move inside a revolving door by applying a predetermined weight to each of the received first control information and second control information. The module identifying a moving route inside a revolving door 1430 may control the driver 120 such that the robot 100 moves based on the identified third control information.

According to one or more embodiments, the module identifying a time point of exiting a revolving door 1445 may identify whether a swing door corresponding to a free space is located within a predetermined distance from a target location outside a revolving door. If the swing door is located within the predetermined distance from the target location outside the revolving door, the module identifying a time point of exiting a revolving door 1445 may control the driver 120 such that the robot 100 exits the revolving door within a predetermined time from a time point wherein the swing door is located within the predetermined distance. Here, the target location may be any one of a plurality of intermediate target points included in the driving route.

According to one or more embodiments, the module identifying a time point of exiting a revolving door 1445 may identify a distance between a swing door and a target location based on an obtained photographed image and map information corresponding to a driving space stored in the memory. The module identifying a time point of exiting a revolving door 1445 may control the driver 120 such that the robot 100 exits the revolving door within a predetermined time from a time point wherein the swing door is located within the predetermined distance. The predetermined time may be time for the robot 100 to exit the revolving door safely. The size of the predetermined time may be smaller than the size of a time section wherein the inlet of the revolving door is opened.

According to one or more embodiments, if the robot 100 exits a revolving door, the target location driving module 1450 may control the driver 120 such that the robot 100 moves to a target location.

According to one or more embodiments, the robot 100 may obtain information on a revolving door through a photographed image, and identify a time point for the robot 100 to enter the revolving door by using this. If the time point for the robot 100 to enter the revolving door is identified, the robot 100 may enter the revolving door and move, and reach a target point. In this case, the robot 100 may drive in consideration of an object that passes through or is going to pass through the revolving door. Accordingly, the robot 100 may pass through the revolving door safely in consideration of a person around the revolving door, and may reach a target point without bypassing the revolving door.

Methods according to one or more embodiments may be implemented in forms of applications that may be installed on robots. The methods according to one or more embodiments may be performed by using a neural network based on deep learning (or a deeply trained neural network), e.g., a learning network model. Also, the methods according to one or more embodiments may be implemented with a software upgrade, or a hardware upgrade for a robot. In addition, one or more embodiments may also be performed through an embedded server provided on a robot, or an external server of a robot.

Also, according to one or more embodiments, one or more embodiments may be implemented as software including instructions stored in machine-readable storage media, which may be read by machines (for example, computers). The machines refer to devices that call instructions stored in a storage medium, and may operate according to the called instructions. Such devices may include one or more displays. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

In addition, the methods according to one or more embodiments may be provided in a computer program product. A computer program product refers to a product, and it may be traded between a seller and a buyer. A computer program product may be distributed on-line in the form of a storage medium that is readable by machines (for example, a compact disc read only memory (CD-ROM)), or through an application store (for example, Play StoreT™). In the case of on-line distribution, at least a portion of a computer program product may be stored in a storage medium such as the server of the manufacturer, the server of the application store, and the memory of the relay server at least temporarily, or may be generated temporarily.

Further, each of the components according to one or more embodiments (for example, a module or a program) may consist of a singular object or a plurality of objects. Also, among the aforementioned corresponding sub components, other sub components may be further included in one or more embodiments. Some components (for example, a module or a program) may be integrated as an object, and perform the functions that were performed by each of the components before integration identically or in a similar manner. Operations performed by a module, a program, or other components according to one or more embodiments may be executed sequentially, in parallel, repetitively, or heuristically. Or, at least some of the operations may be executed in a different order, or other operations may be added.

Although the foregoing embodiments have been shown and described, the disclosure is not limited thereto, and various modifications may be made by those having ordinary skill in the technical field to which the disclosure belongs, without departing from the scope of the disclosure.

What is claimed is:

1. A drivable robot comprising:

at least one sensor;

a driver;

at least one processor; and memory storing one or more instructions that, when executed by the at least one processor, cause the robot to:

based on identifying a revolving door in a photographed image obtained by the at least one sensor, identify free space information of a free space inside the revolving door and object information of an object that is to enter the revolving door based on the photographed image, wherein the object information comprises moving route information of a predicted moving route of the object;

identify a first time point for the robot to enter the revolving door based on the free space information and the object information; and control the driver such that the robot enters the revolving door at the first time point.

2. The robot of claim 1, wherein the at least one processor is configured to execute the one or more instructions to cause the robot to:

based on identifying the robot is to enter the revolving door at a current time point, control the driver such that the robot enters the revolving door; and based on identifying the robot is not to enter the revolving door at the current time point, control the driver such that the robot waits for a second time point for the robot to enter the revolving door, or identify a driving route avoiding the revolving door.

3. The robot of claim 1, wherein the robot is configured to store first space information corresponding to the robot in the memory, and wherein the at least one processor is configured to execute the one or more instructions to cause the robot to:

identify whether a first shape of a space corresponding to the robot is inside a second shape of the free space based on the free space information and the first space information; and based on identifying the first shape is inside the second shape, identify a third time point for the robot to enter the revolving door based on a first location of the free space.

4. The robot of claim 3, wherein the robot is configured to store second space information corresponding to the object in the memory, and wherein the at least one processor is configured to execute the one or more instructions to cause the robot to:

based on identifying at least one first object is to enter the revolving door based on the moving route information, update the free space information based on the second space information;

identify whether the first shape is inside the second shape based on the updated free space information and the first space information; and based on identifying the first shape is inside a third shape of an updated free space of the updated free space information, identify a fourth time point for the robot to enter the revolving door based on a second location of the updated free space.

5. The robot of claim 4, wherein the at least one processor is configured to execute the one or more instructions to cause the robot to:

based on identifying at least one second object is to enter the revolving door based on the moving route information, identify:

a number of the at least one second object, and an entering location inside the revolving door; and identify a fifth time point for the robot to enter the revolving door based on:

the number of the at least one second object, and the entering location inside the revolving door.

6. The robot of claim 1, wherein the free space information comprises at least one of radius information, rotation axis information, or angle information of an angle corresponding to the free space, and wherein the at least one processor is configured to execute the one or more instructions to cause the robot to:

identify location information of a third location of the free space inside the revolving door and moving speed information of a moving speed of the free space based on the free space information; and identify a sixth time point for the robot to enter the revolving door based on the location information and the moving speed information.

7. The robot of claim 6, wherein the at least one processor is configured to execute the one or more instructions to cause the robot to, based on the robot entering the revolving door, control the driver such that the robot is located in a center area of an inscribed circle corresponding to the free space.

8. The robot of claim 6, wherein the at least one processor is configured to execute the one or more instructions to cause the robot to:

based on the robot entering the revolving door, identify a predetermined reference point in a swing door corresponding to the free space; and control the driver such that the robot moves to follow the predetermined reference point.

9. The robot of claim 8, wherein the at least one processor is configured to execute the one or more instructions to cause the robot to:

identify first control information for the robot to be located in a center area of an inscribed circle corresponding to the free space;

identify second control information for the robot to move to follow the predetermined reference point;

identify third control information for the robot to move inside the revolving door based on applying a predetermined weight to each of the first control information and the second control information; and control the driver based on the third control information.

10. The robot of claim 1, wherein the at least one processor is configured to execute the one or more instructions to cause the robot to:

based on the robot entering the revolving door, identify whether a swing door corresponding to the free space is located within a predetermined distance from a target location outside the revolving door; and control the driver such that the robot exits the revolving door within a predetermined time from a seventh time point when the swing door was identified to be located within the predetermined distance.

11. The robot of claim 10, wherein the at least one processor is configured to execute the one or more instructions to cause the robot to:

identify whether at least one third object located inside the revolving door is exiting the revolving door; and based on identifying the at least one third object exited the revolving door, control the driver such that the robot exits the revolving door within the predetermined time from the seventh time point.

12. A control method of a drivable robot, the method comprising:

based on identifying a revolving door in a photographed image obtained by at least one sensor, identifying free space information of a free space inside the revolving door and object information of an object that is to enter the revolving door based on the photographed image, wherein the object information comprises moving route information of a predicted moving route of the object;

identifying a first time point for the robot to enter the revolving door based on the free space information and the object information; and controlling a driver such that the robot enters the revolving door at the first time point.

13. The control method of claim 12, wherein the controlling the driver comprises, based on identifying the robot is to enter the revolving door at a current time point, controlling the driver such that the robot enters the revolving door, and wherein the control method further comprises, based on identifying the robot is not to enter the revolving door at the current time point, controlling the driver such that the robot waits for a second time point for the robot to enter the revolving door, or identifying a driving route avoiding the revolving door.

14. The control method of claim 12, wherein the identifying the first time point comprises:

identifying whether a first shape of a space corresponding to the robot is inside a second shape of the free space based on the free space information and first space information corresponding to the robot; and based on identifying the first shape is inside the second shape, identifying a third time point for the robot to enter the revolving door based on a first location of the free space.

15. The control method of claim 14, wherein the identifying the first time point comprises:

based on identifying at least one first object is to enter the revolving door based on the moving route information, updating the free space information based on second space information corresponding to the object;

identifying whether the first shape is inside the second shape based on the updated free space information and the first space information; and based on identifying the first shape is inside a third shape of an updated free space of the updated free space information, identifying a fourth time point for the robot to enter the revolving door based on a second location of the updated free space.

16. The control method of claim 15, wherein the identifying the first time point further comprises:

based on identifying at least one second object is to enter the revolving door based on the moving route information, identifying:

a number of the at least one second object, and an entering location inside the revolving door; and identifying a fifth time point for the robot to enter the revolving door based on:

the number of the at least one second object, and the entering location inside the revolving door.

17. The control method of claim 12, wherein the free space information comprises at least one of radius information, rotation axis information, or angle information of an angle corresponding to the free space, and wherein the identifying the first time point comprises:

identifying location information of a third location of the free space inside the revolving door and moving speed information of a moving speed of the free space based on the free space information; and identifying a sixth time point for the robot to enter the revolving door based on the location information and the moving speed information.

18. The control method of claim 17, further comprising, based on the robot entering the revolving door, controlling the driver such that the robot is located in a center area of an inscribed circle corresponding to the free space.

19. The control method of claim 17, further comprising:

based on the robot entering the revolving door, identifying a predetermined reference point in a swing door corresponding to the free space; and controlling the driver such that the robot moves to follow the predetermined reference point.

20. A non-transitory computer-readable recording medium storing computer instructions that, when executed by at least one processor, cause a drivable robot to:

based on identifying a revolving door in a photographed image obtained by at least one sensor, identify free space information of a free space inside the revolving door and object information of an object that is to enter the revolving door based on the photographed image, wherein the object information comprises moving route information of a predicted moving route of the object;

identify a first time point for the robot to enter the revolving door based on the free space information and the object information; and control a driver such that the robot enters the revolving door at the first time point.

* * * * *